(12) United States Patent
Mae et al.

(10) Patent No.: US 8,529,352 B2
(45) Date of Patent: Sep. 10, 2013

(54) GAME SYSTEM

(75) Inventors: Kenichi Mae, Kyoto (JP); Eizi Kawai, Kyoto (JP); Atsushi Watanabe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 39 days.

(21) Appl. No.: 13/017,527

(22) Filed: Jan. 31, 2011

(65) Prior Publication Data

US 2011/0190050 A1     Aug. 4, 2011

(30) Foreign Application Priority Data

Feb. 3, 2010   (JP) ................................. 2010-022022
Feb. 3, 2010   (JP) ................................. 2010-022023

(51) Int. Cl.
    *A63F 9/24*     (2006.01)
(52) U.S. Cl.
    USPC .......................................................... 463/42
(58) Field of Classification Search
    USPC .......................................................... 463/42
    See application file for complete search history.

(56) References Cited

U.S. PATENT DOCUMENTS

| | | | |
|---|---|---|---|
| 4,210,329 A * | 7/1980 | Steiger et al. ...................... | 463/5 |
| 5,009,501 A * | 4/1991 | Fenner et al. ............... | 356/141.3 |
| 6,396,480 B1 | 5/2002 | Schindler et al. | |
| 6,540,610 B2 | 4/2003 | Chatani | |
| 6,557,001 B1 * | 4/2003 | Dvir et al. ............................ | 1/1 |
| 6,716,103 B1 | 4/2004 | Eck et al. | |
| 7,030,856 B2 * | 4/2006 | Dawson et al. ............... | 345/158 |
| 7,275,994 B2 | 10/2007 | Eck et al. | |
| 7,352,358 B2 | 4/2008 | Zalewski et al. | |
| 7,352,359 B2 | 4/2008 | Zalewski et al. | |
| 7,391,409 B2 | 6/2008 | Zalewski et al. | |
| 2002/0165028 A1 | 11/2002 | Miyamoto et al. | |
| 2003/0027517 A1 * | 2/2003 | Callway et al. ............... | 455/3.01 |
| 2004/0023719 A1 | 2/2004 | Hussaini et al. | |
| 2006/0252541 A1 | 11/2006 | Zalewski et al. | |
| 2007/0049374 A1 | 3/2007 | Ikeda et al. | |
| 2008/0030458 A1 | 2/2008 | Helbing et al. | |

(Continued)

FOREIGN PATENT DOCUMENTS

| | | |
|---|---|---|
| EP | 2007/128949 | 11/2007 |
| JP | 9-294260 | 11/1997 |

(Continued)

OTHER PUBLICATIONS

Apple Support: "iPhone Technical Specifications", Apple, Aug. 22, 2008, URL:http://support.apple.com/kp/SP495, 2 pages.

(Continued)

*Primary Examiner* — Corbett B Coburn
(74) *Attorney, Agent, or Firm* — Nixon & Vanderhye, P.C.

(57) ABSTRACT

A game system includes at least one image output device and a game apparatus. The image output device is connected to a display device via wiring. The game apparatus is capable of wirelessly communicating with the image output device and is connected via wiring to another display device different from the display device connected to the image output device. The game apparatus performs a game process and generates an image based on the game process. The generated image is displayed on the display device connected to the game apparatus. The generated image is also transmitted to the image output device. The image output device receives the image transmitted by the game apparatus. The image output device outputs the received image to the display device on which the image is displayed.

23 Claims, 15 Drawing Sheets

| | FIRST DISPLAY | SECOND DISPLAY |
|---|---|---|
| FIRST USAGE PATTERN | IMAGE A | NO IMAGE |
| SECOND USAGE PATTERN | NO IMAGE | IMAGE A |
| THIRD USAGE PATTERN | IMAGE A | IMAGE A |
| FOURTH USAGE PATTERN | IMAGE A | IMAGE B |

(56) References Cited

U.S. PATENT DOCUMENTS

| | | |
|---|---|---|
| 2008/0220867 A1 | 9/2008 | Zalewski et al. |
| 2010/0007926 A1 | 1/2010 | Imaizumi et al. |
| 2010/0083341 A1* | 4/2010 | Gonzalez .................. 725/149 |

FOREIGN PATENT DOCUMENTS

| | | |
|---|---|---|
| JP | 2004-32548 | 1/2004 |
| JP | 2007-61271 | 3/2007 |
| JP | 2009-178363 | 8/2009 |
| JP | 2009-247763 | 10/2009 |
| JP | 2010-17412 | 1/2010 |
| WO | 2007/128949 | 11/2007 |

OTHER PUBLICATIONS

May 10, 2012 European Search Report for EP11739553.3, 8 pages.
Apr. 26, 2012 Office Action for U.S. Appl. No. 13/019,928, 18 pages.
International Search Report for PCT/JP2011/000565, Mar. 8, 2011, 3 pages.
International Search Report for PCT/JP2011/000566, Mar. 8, 2011, 3 pages.
Mar. 16, 2012 Office Action for U.S. Appl. No. 13/019,924, 14 pages.

* cited by examiner

Fig. 14

|  | FIRST DISPLAY | SECOND DISPLAY |
|---|---|---|
| FIRST USAGE PATTERN | IMAGE A | NO IMAGE |
| SECOND USAGE PATTERN | NO IMAGE | IMAGE A |
| THIRD USAGE PATTERN | IMAGE A | IMAGE A |
| FOURTH USAGE PATTERN | IMAGE A | IMAGE B |

GAME SYSTEM

CROSS REFERENCE TO RELATED APPLICATION

The disclosures of Japanese Patent Applications Nos. 2010-022022 and 2010-022023, both filed Feb. 3, 2010, are incorporated herein by reference.

BACKGROUND OF THE INVENTION

1. Field of the Invention

The present invention relates to game systems, more specifically to a game system in which an image is displayed using a television display or suchlike as a display device.

2. Description of the Background Art

Conventionally, there are household game systems in which a television display or suchlike is used as a display device. For example, a game system disclosed in Patent Document 1 (Japanese Laid-Open Patent Publication No. 2007-61271) employs a configuration in which a game apparatus, which performs a game process based on a game program, is connected to a television by wire. Specifically, in the game system, the game apparatus reads a game program stored on an optical disk to perform a game process, thereby generating a game image which is transmitted to the television and displayed on the television screen.

In conventional game systems, only one display device is used for displaying game images, and therefore only limited game images can be represented. For example, conventional methods that are taken to play a game among a plurality of players include a method in which one game image is generated to be commonly viewed by all the players and a method in which a game image is generated for each player so that a plurality of game images are displayed in one screen with the display area of the display screen being divided. However, in both of the above cases, it might become difficult for the players to view game images. Also, it is difficult to play a game among a plurality of players using a plurality of display devices because a plurality of sets of game apparatuses and software media are required.

SUMMARY OF THE INVENTION

Therefore, an objective of the present invention is to provide a game system in which a game can be played using one game apparatus with a plurality of display devices.

To solve the aforementioned problem, the present invention employs the following features (1) to (14).

(1) The present invention is directed to a game system comprising at least one image output device and a game apparatus. The image output device is connected to a display device via wiring. The game apparatus is capable of wirelessly communicating with the image output device and is connected via wiring to another display device different from the display device connected to the image output device. The game apparatus includes a game process section, an image generation section, a first image output section and a first communication section. The image output device includes a second communication section and a second image output section. The game process section performs a game process. The image generation section generates an image based on the game process. The first image output section displays the image on the display device connected to the game apparatus. The first communication section transmits the image to the image output device. The second communication section receives the image from the game apparatus. The second image output section displays the image on the display device connected to the image output device.

The "image output device" may be any device connected to the display device via wiring and capable of wirelessly communicating with the game apparatus. The device may or may not have the function of a marker device in an embodiment to be described later. Note that the meaning of the phrase "connected to the display device via wiring" encompasses the case where the display device and the image output device are provided independently of each other and connected together by a cable and also the case where the display device and the image output device are integrally provided (within a housing) and connected together via wiring (a transmission path) in the housing.

The "game apparatus" may be any information processing device which performs a game process and generates an image based on the game process. Specifically, the game apparatus may be a dedicated information processing device for game use or a versatile information processing device such as a typical personal computer.

The "game system" may simply include the image output device and the game apparatus and does not have to include any display device connectable to the image output device via wiring. That is, the game system is not provided in such a form as to include the display device.

The "game process section" may be an information processing section for performing an arbitrary game process, as in the case of a CPU 10 performing the process of step S13 to be described later.

The "image generation section" may be any element for generating an image based on a game process, as in the case of the CPU 10 (and a GPU 11b) performing the process of step S22, S25 or S27 to be described later.

The "first image output section" may be any element for outputting an image to the display device connected to the game apparatus, e.g., an AV-IC 15 in the embodiment to be described later.

The "first communication section" may be any element capable of wirelessly communicating with the image output device, e.g., a high-speed wireless communication module 28 in the embodiment to be described later.

The "second communication section" may be any element capable of wirelessly communicating with the game apparatus, e.g., a high-speed wireless communication module 34 in the embodiment to be described later.

The "second image output section" may be any element for outputting an image to the display device connected to the image output device, e.g., an AV-IC 36 in the embodiment to be described later.

According to the above feature (1), the game system allows image display on both the display device connected to the image output device and another display device connected to the game apparatus. Thus, according to the above feature (1), it is possible to play a game using one game apparatus with a plurality of display devices.

(2) The game system may further include two operating devices capable of generating operation information based on a player's operation and wirelessly outputting the operation information. In this case, the image output device further includes a first operation information reception section for receiving the operation information outputted by one of the two operating devices. The second communication section transmits to the game apparatus the operation information received by the first operation information reception section or information generated from the operation information. The first communication section receives the information transmitted by the second communication section. The game apparatus further includes a second operation information reception section for receiving the operation information outputted by the other of the two operating devices. The game process section performs the game process based on the information received by the first communication section and the operation information received by the second operation information reception section.

The phrase "further include two operating devices" is intended to mean that the game system includes at least two operating devices, and the game system may include three or more operating devices.

The "first operation information reception section" may be any element of the image output device that receives the operation information, as in the case of a controller communication module 39 in the embodiment to be described later.

Also, the second communication section may transmit either the "operation information received by the first operation information reception section" or the "information generated from the operation information". Specifically, the second communication section may transmit operation information received from the operating device to the game apparatus without modification or after processing (e.g., correction).

The "second operation information reception section" may be any element of the game apparatus that receives the operation information, as in the case of a controller communication module 19 in the embodiment to be described later.

According to the above feature (2), the operation information from one of the two operating devices included in the game system is transmitted to the game apparatus via the image output device. Here, the operating device is used around the image output device, i.e., the operating device can be used away from the game apparatus, and in such a case, wireless communication between the operating device and the game apparatus might become difficult. On the other hand, according to the above feature (2), wireless communication is performed between the operating device and the image output device, and therefore wireless communication can be reliably performed, thereby ensuring that the operation information is reliably transmitted from the operating device to the game apparatus.

(3) The game system may further include two operating devices capable of generating operation information based on a player's operation and wirelessly outputting the operation information. In this case, the game apparatus further includes a second operation information reception section for receiving the operation information outputted by the two operating devices. The game process section performs the game process based on the operation information received by the second operation information reception section.

According to the above feature (3), the operation information outputted from the operating device can be directly transmitted to the game apparatus.

(4) The image generation section may generate first and second images different from each other. In this case, the first image output section causes the display device connected to the game apparatus to display the first image. The first communication section transmits the second image to the image output device. The second image output section causes the display device connected to the image output device to display the second image.

According to the above feature (4), different images can be displayed on the display device connected to the game apparatus and the display device connected to the image output device. As a result, for example, when players use their respective different display devices, images corresponding to the players can be displayed on the display devices. Also, for example, when one player uses a plurality of display devices, the player can be provided with more information via the display devices. In this manner, according to the above feature (4), different display devices can display different images, making it possible to present images in a more user-friendly manner.

(5) The present invention is also directed to a game system including a plurality of image output devices connected to their respective display devices and a game apparatus capable of wirelessly communicating with the image output devices. The game apparatus includes a game process section, an image generation section and a first communication section. Each of the image output devices includes a second communication section and a second image output section. The game process section performs a game process. The image generation section generates an image based on the game process. The first communication section transmits the image to each of the image output devices. The second communication section receives the image from the game apparatus. The second image output section displays the image on the display device.

According to the above feature (5), the game system allows image display on display devices connected to their respective image output devices. Thus, according the above feature (5), a game can be played using one game apparatus with a plurality of display devices, as in (1) above.

(6) The game system may further include a plurality of operating devices capable of generating operation information based on a player's operation and wirelessly outputting the operation information. In this case, each of the image output devices further includes a first operation information reception section for receiving the operation information outputted by the operating devices. The second communication section transmits to the game apparatus the operation information received by the first operation information reception section or information generated from the operation information. The first communication section receives the information transmitted by the second communication section. The game process section performs the game process based on the information received by the first communication section.

According to the above feature (6), the operation information outputted from the operating devices is transmitted to the game apparatus via the image output devices. Here, while it is assumed that the operating devices are used around the image output devices, the operating devices can be used away from the game apparatus, and in such a case, wireless communication between the operating devices and the game apparatus might become difficult. On the other hand, according to the above feature (6), wireless communication is performed between the operating devices and the image output devices, and therefore wireless communication can be reliably performed, thereby ensuring that the operation information is reliably transmitted to the game apparatus.

(7) The game system may further include a plurality of operating devices capable of generating operation information based on a player's operation and wirelessly outputting the operation information. In this case, the game apparatus further includes a second operation information reception section for receiving the operation information outputted by the operating devices. The game process section performs the game process based on the operation information received by the second operation information reception section.

According to the above feature (7), the operation information outputted from the operating devices can be directly transmitted to the game apparatus.

(8) The image generation section may generate a plurality of images corresponding to the image output devices. In this case, the first communication section transmits to the image output devices their corresponding images.

The phrase "generate a plurality of images corresponding to the image output devices" is intended to mean that the same number of images as the image output devices are generated. Specifically, for example, when there are three image output devices, the image generation section generates three images respectively corresponding to the image output devices. In this case, the first communication section transmits one corresponding image to each image output device.

According to the above feature (8), different images can be displayed on display devices connected to their respective image output devices. In this manner, according to the above feature (8), different display devices can display different images, making it possible to present images in a more user-friendly manner, as in (4) above.

(9) The game apparatus may further include an image compression section for compressing the image generated by the image generation section. In this case, the first communication section transmits the compressed image. Each of the image output devices further includes an image expansion section for expanding the image received by the second communication section. The second image output section outputs the expanded image to the display device connected to the image output device.

While the "image compression section" performs a compression process on the image to reduce the quantity of data and the "image expansion section" performs an expansion process to return the compressed image to its original state, any compression/expansion schemes or algorithms may be employed.

According to the above feature (9), the wirelessly transmitted image is compressed, and therefore the quantity of data to be communicated from the game apparatus to each image output device can be reduced (compared to the case where the image is not compressed). Thus, image transmission to the image output device can be performed at high speed, thereby preventing the game operation from being adversely affected by a delay in image display.

(10) Each of the image output devices may be further connected to an audio output device. In this case, the game apparatus further includes an audio generation section for generating audio based on the game process. The first communication section further transmits the audio to the image output device. The second communication section further receives the audio from the game apparatus. The image output device further includes an audio output section for outputting the audio from the audio output device.

While the "audio output device" corresponds to a speaker provided in a display device (television) in the embodiment to be described later, the "audio output device" may be provided independently of the display device so long as it is connected to the image output device.

The "audio generation section" may be any element for generating audio based on a game process, as in the case of the CPU 10 (and GPU 11*b*) performing the process of step S22, S25 or S27 to be described later.

The "audio output section" may be any element for outputting audio to the audio output device, e.g., the AV-IC 36 in the embodiment to be described later.

Note that in (10) above, audio data transmitted from the game apparatus to each of the image output device may or may not be compressed.

According to the above feature (10), the image output devices can output game audio in addition to game images.

(11) Each of the operating devices may include at least one detector selected from among an acceleration sensor, an image pickup device and a gyroscope, and may output a detection result by the detector as the operation information.

According to the above feature (11), the detection result by at least the acceleration sensor, the image pickup device or the gyroscope is used in the game process as operation information. Thus, the user's operation of moving each operating device can be used as game operation, making it possible to provide a more enjoyable game. Also, in (11) above, the operating devices are of a wireless type and therefore are particularly suitable for operations of moving the operating devices.

(12) Each of the image output devices may further include a predetermined imaging subject. In this case, the game system further includes an operating device equipped with an image pickup section capable of detecting the imaging subject, the operating device being capable of outputting an imaging result by the image pickup section. The game process section performs the game process based on the imaging result by the image pickup section.

While the "predetermined imaging subject" corresponds to a marker (more concretely, an infrared LED) included in a marker section 32 in the embodiment to be described later, this is not restrictive and any element may be employed so long as the game apparatus (the image output device or the operating device) can recognize the imaging subject in an image obtained as an imaging result. For example, the predetermined imaging subject does not have to be a light-emitting member and may be a mark or suchlike having a predetermined shape, for example.

According to the above feature (12), the image output device and the imaging subject are integrally provided. Here, considering the fact that the user (player) faces the display device while playing a game, the imaging subject is preferably installed around the display device. On the other hand, the image output device is connected to the display device via wiring and therefore installed around the display device. Thus, according to the above feature (12), by integrally providing two elements (the image output device and the imaging subject) to be installed around the display device, it becomes possible to save the user's time and effort to install the two elements.

(13) The game apparatus may further include a readout section for reading information from an external storage medium having a game program stored therein. In this case, the game process section performs the game process based on the game program being read by the readout section.

The "external storage medium" is a concept encompassing an optical disk (a disk storage medium) in the embodiment to be described later as well as any other storage media such as memory card and cartridge.

According to the above feature (13), by replacing the external storage medium having a game program stored therein, it becomes possible to readily change the game program to be executed in the game apparatus.

(14) The readout section may be a disk drive device for reading information from a disk storage medium loadable into the game apparatus.

According to the above feature (14), by using the disk storage medium loadable into the game apparatus as the external storage medium, it becomes possible to readily replace the storage medium. In particular, when the game apparatus and the display device are not connected by wire, the user can have the game apparatus handy while playing a game (see FIG. 15), and in such a case, the user can replace the storage medium with great ease.

According to the present invention, the game system includes the image output device capable of communicating with the game apparatus, and therefore images can be displayed using a display device connected to the game apparatus and a display device connected to the image output device, or using display devices connected to their respective image output devices, thereby making it possible to play a game using one game apparatus with a plurality of display devices.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing for each usage pattern game images to be displayed on two displays through the process shown in FIG. 12;

DESCRIPTION OF THE PREFERRED EMBODIMENTS

Overall Configuration of the Game System

Figure 1:
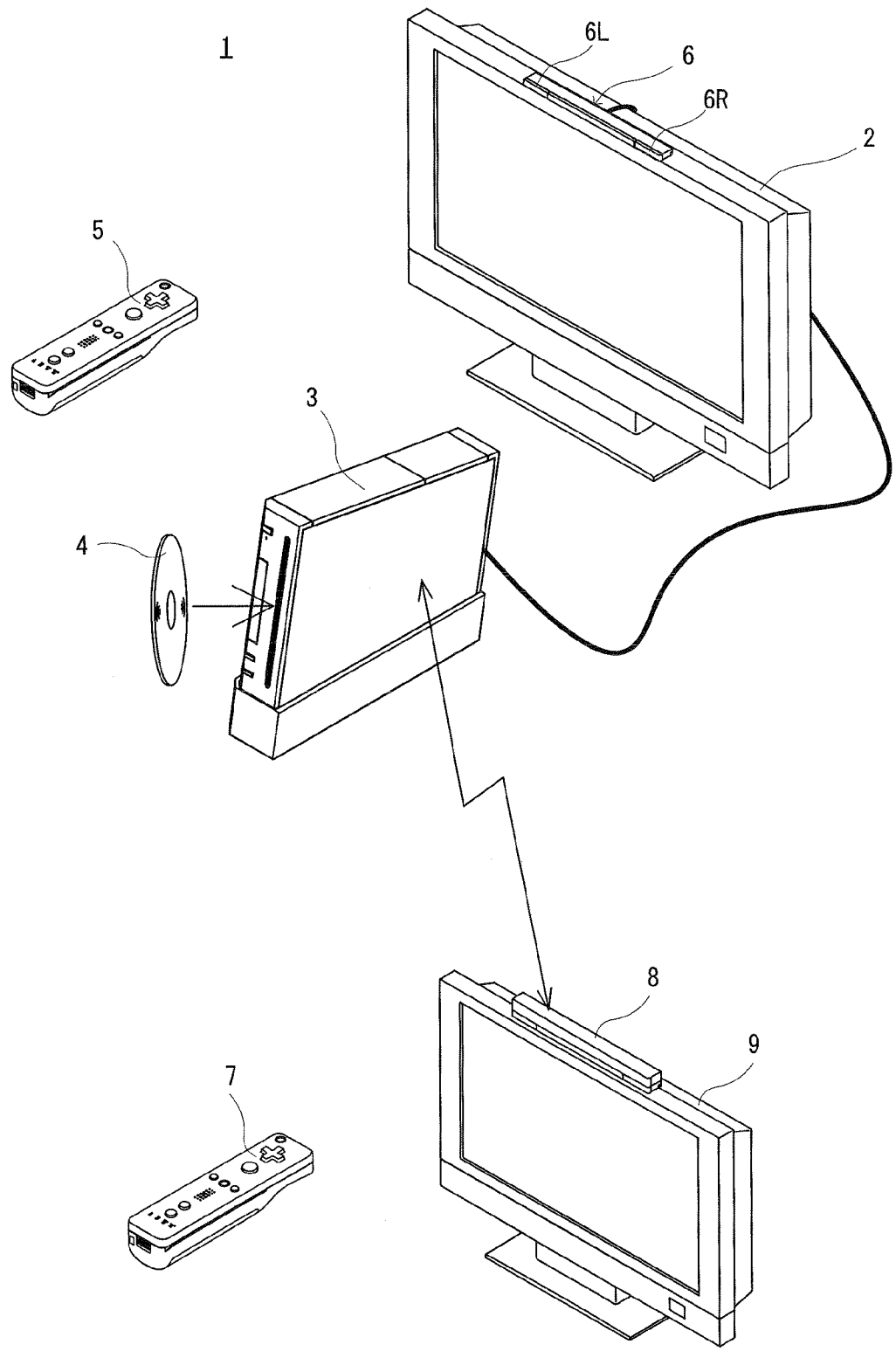
FIG. 1 is an external view of a game system according to the present invention.
Figure 2:
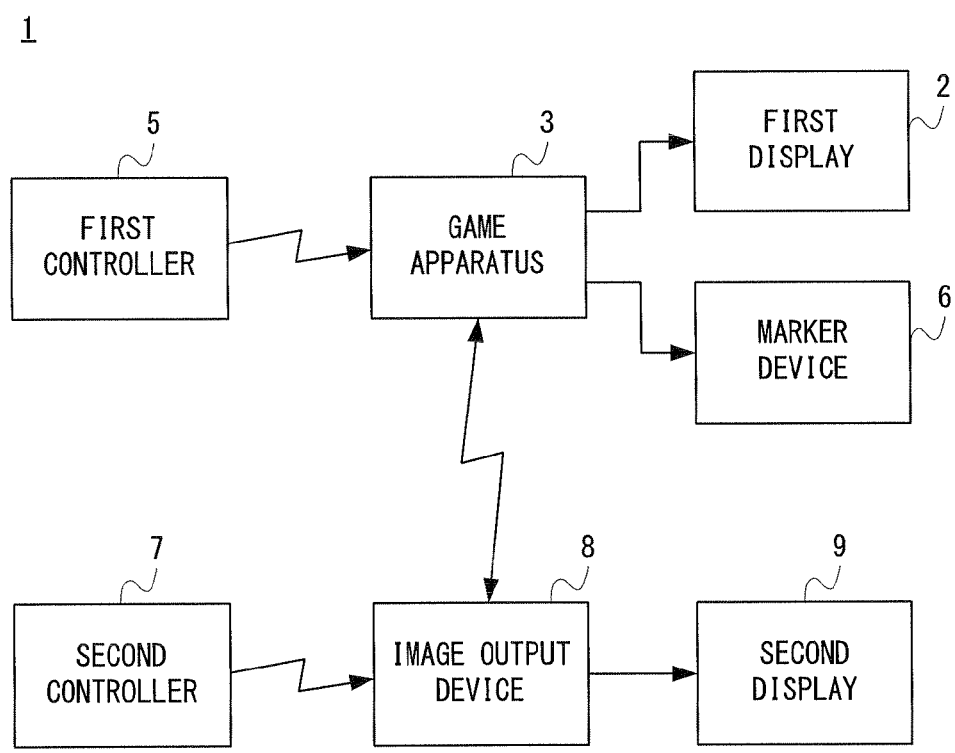
FIG. 2 is a block diagram illustrating connections between devices included in the game system.

Hereinafter, a game system 1 according to an embodiment of the present invention will be described with reference to the drawings. FIG. 1 is an external view of the game system 1. Also, FIG. 2 is a block diagram illustrating connections between devices included in the game system 1. In FIG. 1, the game system 1 includes a display device (hereinafter, a "first display") 2 as typified by a television receiver or suchlike, a game apparatus 3, an optical disk 4, a first controller 5, a marker device 6, a second controller 7, an image output device 8, and a second display 9. The game system 1 performs a game process in the game apparatus 3 based on a game operation using the first controller 5 and/or the second controller 7, and displays a game image(s) or suchlike resulting from the game process on the first display 2 and/or the second display 9.

In the game apparatus 3, the optical disk 4 typifying an information storage medium used for the game apparatus 3 in a replaceable manner is detachably inserted. A game program executed by the game apparatus 3 is stored in the optical disk 4. The game apparatus 3 has, on the front surface thereof, an insertion opening for the optical disk 4. The game apparatus 3 reads and executes the game program stored in the optical disk 4 which is inserted through the insertion opening, so as to perform the game process.

The first controller 5 is an input device providing the game apparatus 3 with operation data indicating the contents of the operation performed on the first controller. As shown in FIG. 2, the first controller 5 and the game apparatus 3 are connected via wireless communication. In the present embodiment, for example, Bluetooth (registered trademark) technology is used for the wireless communication between the first controller 5 and the game apparatus 3. In another embodiment, the first controller 5 and the game apparatus 3 may be connected by wire.

As shown in FIGS. 1 and 2, the game apparatus 3 is connected to the first display 2 via a connecting cable. The first display 2 displays a game image resulting from a game process performed by the game apparatus 3. The first display 2 includes a speaker 2a (FIG. 3) which outputs game audio resulting from the game process. Note that in another embodiment, the game apparatus 3 and the first display 2 may be provided as an integral unit. Also, the game apparatus 3 and the first display 2 may communicate wirelessly.

The marker device 6 is installed around the first display 2 (in FIG. 1, above the screen). As will be described in detail later, the user can perform a game operation of moving the first controller 5, and the marker device 6 is used by the game apparatus 3 to detect the movement of the first controller 5. The marker device 6 includes two markers 6R and 6L at its opposite ends. Specifically, the marker 6R (and also the marker 6L) is composed of one or more infrared LEDs (Light-Emitting Diodes) for outputting infrared light forward from the first display 2. As shown in FIG. 2, the marker device 6 is connected to the game apparatus 3, and the game apparatus 3 controls lighting of each infrared LED included in the marker device 6. While FIG. 1 illustrates the marker device 6 as being installed on the first display 2, the position and direction in which to install the marker device 6 are optional.

As shown in FIGS. 1 and 2, the image output device 8 can wirelessly communicate with the game apparatus 3. The image output device 8 receives a game image and game audio, which result from a game process, from the game apparatus 3. As shown in FIG. 2, the second display 9 is connected to the image output device 8 via wiring such as a connecting cable. The second display 9 displays the game image received by the image output device 8. The second display 9 includes a speaker 9a (FIG. 4) which outputs the game audio received by the image output device 8. Also, the image output device 8 and the second display 9 may be provided as an integral unit. Specifically, the image output device 8 may include an internal display so that an image is directly outputted on the screen via wiring in the device. The internal display is highly convenient if it is in a hand-held size and therefore can be readily carried. Alternatively, the image output device 8 may include a hand-held size display and images may also be outputted to an external display connected thereto via wiring such as a cable. This configuration makes it possible to deal with various situations because the external display can be used if it is relatively large, such as a television receiver, or the image can be viewed on the hand-held display screen if no external display is connected.

Figure 4:
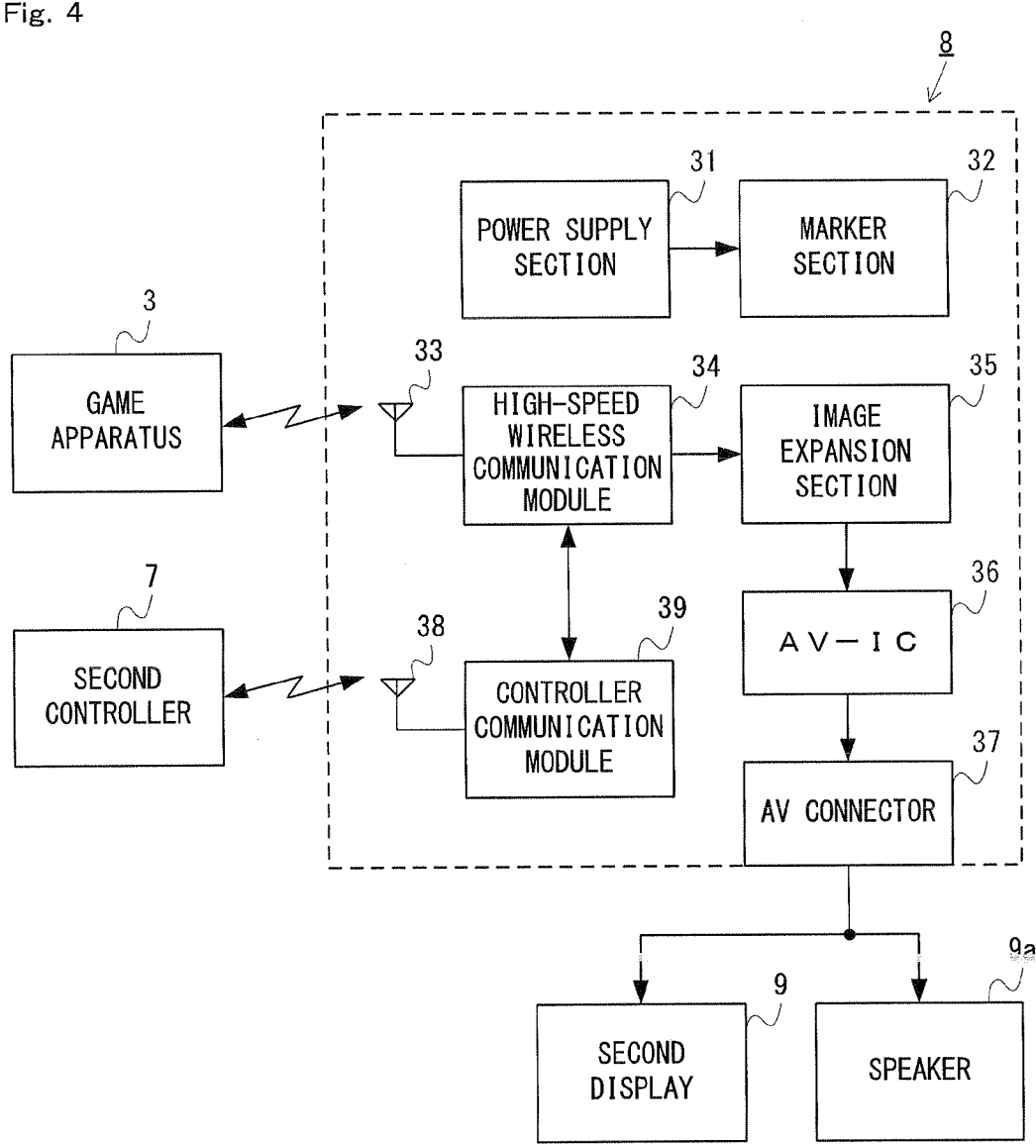
FIG. 4 is a block diagram illustrating the configuration of an image output device.

Also, as will be described in detail later with reference to FIG. 4, the image output device 8 has the same function as the marker device 6. Specifically, the image output device 8 is provided with one marker, which consists of one or more infrared LEDs, on each side. Each marker outputs infrared light forward from the second display 9. Therefore, as shown in FIG. 1, the image output device 8 is installed around the second display 9. While FIG. 1 illustrates the image output device 8 as being installed on the second display 9, the position and direction in which to install the image output device 8 are optional.

Similar to the first controller 5, the second controller 7 is an input device which outputs operation data indicating the contents of the operation performed on the second controller. As shown in FIG. 2, the second controller 7 and the image output device 8 are connected via wireless communication. Operation data outputted by the second controller 7 is received by the image output device 8, which in turn transmits the data to the game apparatus 3 via wireless communication. Also, in the present embodiment, for example, Bluetooth (registered trademark) technology is used for the wireless communication between the second controller 7 and the image output device 8, as in the case of the wireless communication between the first controller 5 and the game apparatus 3. Accordingly, in the present embodiment, the first controller 5 can wirelessly communicate not only with the game apparatus 3 but also with the image output device 8, whereas the second controller 7 can wirelessly communicate not only with the image output device 8 but also with the game apparatus 3. That is, any of the controllers 5 and 7 may be used for communication with the game apparatus 3 and the image output device 8. Also, in another embodiment, the second controller 7 and the image output device 8 may be connected by wire. Note that in the following descriptions, unless specifically distinguished, both the first controller 5 and the second controller 7 may be simply referred to as the "controllers". Note that in embodiments, as described above, where the image output device 8 has an internal display, the image output device 8 may include input devices such as keys, a touch panel, and an acceleration sensor. In such a case, the user may operate the input devices included in the image output device 8. That is, the image output device 8, the second display 9 and the second controller 7 may be formed as an integral single device. In such a case, operation data regarding operations on the input devices may be transmitted to the game apparatus 3, rather than operation data being transmitted from the controllers, but still communications with the controllers may be performed as well. That is, in the case where the image output device 8 includes the input devices, the second controller 7 capable of communicating with the image output device 8 may or may not be provided.

As will be described in detail later, the configuration shown in FIGS. 1 and 2 allows the game system 1 to display game images using either (or both) of the two displays 2 and 9. Accordingly, the user can select either of the two displays 2 and 9 as a display for game use (for displaying game images) in accordance with the situations. For example, a case is assumed where the first display 2 is installed in a living room of a household and the second display 9 is installed in another room. In this case, the user can freely select a television (first display 2) in the living room and a television (second display 9) in another room as a display for game use without changing the wiring of the game apparatus 3 and the television. For example, when any family member is using the television in the living room or when the user desires to play a game in his/her own room, the user may use the second display 9. Also, when the user desires to play a game in the living room, the user may use the first display 2. In this manner, the present embodiment allows the user to readily change display devices for game use without taking time and effort to change wiring, for example. In addition, the two displays may be used at the same time to play a game.

Internal Structure of the Game Apparatus 3

Figure 3:
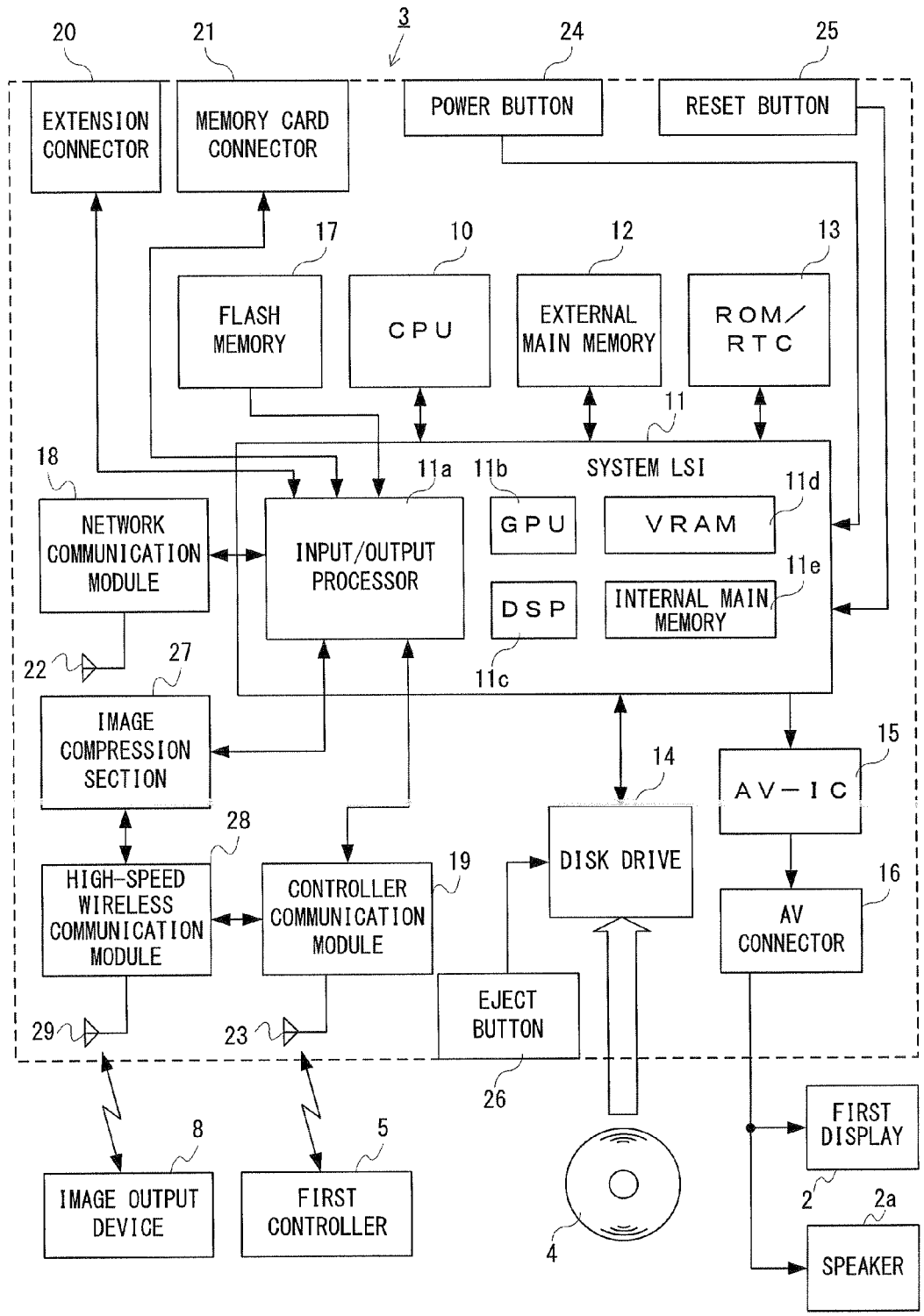
FIG. 3 is a block diagram illustrating the internal structure of a game apparatus.

Next, an internal structure of the game apparatus 3 will be described with reference to FIG. 3. FIG. 3 is a block diagram illustrating the internal structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disk 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. Note that the internal structure of the system LSI will be described later. The external main memory 12 of a volatile type stores a program such as a game program read from the optical disk 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as apart of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the first display 2 through an AV connector 16, and outputs the read audio data to a speaker 2a incorporated in the first display 2. Thus, an image is displayed on the first display 2, and a sound is outputted from the speaker 2a.

The input/output processor 11a performs data transmission to and data reception from the components connected thereto, and download of data from an external device. The input/output processor 11a is connected to the flash memory 17, a network communication module 18, a controller communication module 19, an extension connector 20, a memory card connector 21, and an image compression section 27. The network communication module 18 is connected to an antenna 22. The controller communication module 19 is connected to an antenna 23. The image compression section 27 is connected to a high-speed wireless communication module 28 which is connected to an antenna 29. The high-speed wireless communication module 28 is also connected to the controller communication module 19. When operation data is acquired from the image output device 8, the operation data is received by the high-speed wireless communication module 28 and then outputted to the controller communication module 19 for processing.

The input/output processor 11a is connected to a network, such as the Internet, via the network communication module 18 and the antenna 22, so as to communicate with another game apparatus and various servers (including the server 110) connected to the network. The input/output processor 11a regularly accesses the flash memory 17, and detects the presence or absence of any data which needs to be transmitted to the network, and when detected, transmits the data to the network through the network communication module 18 and the antenna 22. Further, the input/output processor 11a receives data transmitted from another game apparatus, and/or downloads data from a download server, through the network, the antenna 22, and the network communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the first controller 5 through the antenna 23 and the controller communication module 19, and (temporarily) stores the received operation data to a buffer area of the internal main memory 11e or the external main memory 12.

Also, when displaying a game image on the second display 9, the input/output processor 11a outputs game image data generated by the GPU 11b to the image compression section 27. The image compression section 27 performs a predetermined compression process on the image data from the input/output processor 11a. The high-speed wireless communication module 28 wirelessly communicates with the image output device 8. Accordingly, the high-speed wireless communication module 28 transmits the image data compressed by the image compression section 27 to the image output device 8 via the antenna 29. Note that, in the present embodiment, the image data transmitted to the image output device 8 by the game apparatus 3 is intended for game use, and any delayed image display in a game adversely affects operability of the game. Accordingly, as much as possible, it is preferable that image data transmission from the game apparatus 3 to the image output device 8 not be delayed. Therefore, in the present embodiment, the image compression section 27 compresses the image data using highly efficient compression technology such as the H.264 standard. Also, the high-speed wireless communication module 28 performs high-speed wireless communications with the image output device 8 using, for example, MIMO (Multiple Input Multiple Output) technology as employed in the IEEE802.11g standard.

Note that while the transmission of the image data from the game apparatus 3 to the image output device 8 has been described above, in the present embodiment, audio data is also transmitted together with the image data. Specifically, the input/output processor 11a outputs audio data generated by the DSP 11c to the high-speed wireless communication module 28 via the image compression section 27. The high-speed wireless communication module 28 transmits the audio data, along with the image data, to the image output device 8 via the antenna 29. Note that the audio data may or may not be subjected to the data compression process by the image compression section 27.

Also, when data from the image output device 8 (concretely, operation data from the second controller 7) is transmitted to the game apparatus 3, the high-speed wireless communication module 28 receives the data via the antenna 29. The received data is acquired by the input/output processor 11a. Note that in the present embodiment, the data from the image output device 8 to the game apparatus 3 is not subjected to a compression process nor therefore to an expansion process, but in another embodiment, the compression process and the expansion process may be performed in the image output device 8 and the game apparatus 3, respectively.

Note that the range (coverage distance) of wireless communication between the game apparatus 3 and the image output device 8 is preferably set to be in the tens of meters such that the game apparatus 3 and the image output device 8 can wirelessly communicate even if they are installed in different rooms within a household. On the other hand, in the present embodiment, when compared to the range of wireless communication between the game apparatus 3 and the image output device 8, the range of wireless communication between the game apparatus 3 and the first controller 5 is narrowed but the game apparatus 3 and the first controller 5 can wirelessly communicate within the same room.

The input/output processor 11a is connected to the extension connector 20 and the memory card connector 21. The extension connector 20 is a connector for an interface, such as USB or SCSI. Communication with the network is allowed by connecting the extension connector 20 to a medium, such as an external storage medium, another peripheral device, such as a controller, and/or a wired communication connector, without using the network communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disk 4 is ejected from the disk drive 14.

Note that in the present embodiment, when the power button 24 is turned on, the system LSI 11 sets a mode (referred to as a "normal mode") in which power is supplied to each component of the game apparatus 3 via an unillustrated AC adaptor, thereby bringing the component into normal conductive state. On the other hand, when the power button 24 is turned off, the system LSI 11 sets a mode (hereinafter, referred to as a "sleep mode") in which power is supplied to apart of the components of the game apparatus 3, thereby performing power-saving control for keeping power consumption at a minimum level. In the present embodiment, when the sleep mode is set, the system LSI 11 provides an instruction to stop power supply to components other than the input/output processor 11a, the flash memory 17, the external main memory 12, the ROM/RTC 13, the network communication module 18, the controller communication module 19, and the high-speed wireless communication module 28. Accordingly, the sleep mode is a mode in which no application is executed by the CPU 10. However, in the sleep mode also, the game apparatus 3 can receive external data, and data transmitted from other game apparatuses and download servers is stored to the flash memory 17.

The system LSI 11 is supplied with power even during the sleep mode. However, during the sleep mode, the system LSI 11 stops supplying clocks to some of its components: the GPU 11b, the DSP 11c and the VRAM 11d. As a result, these components are not driven, which reduces power consumption. Although not shown, the game apparatus 3 has a fan provided in the housing in order to discharge heat from ICs such as the CPU 10 and the system LSI 11. During the sleep mode, the fan is also stopped.

In addition, the game apparatus 3 can be switched between the normal mode and the sleep mode through a remote operation by pressing the power button of the first controller 5 (or the second controller 7). Note that when such switching is not performed by the remote operation, the controller communication module 19 may be supplied with no power during the sleep mode. Also, the user may instruct the game apparatus 3 not to employ the sleep mode. In the case where the sleep mode is not employed, when the power button 24 is turned off, power supply to all circuits is completely stopped.

Note that in another embodiment, some components of the game apparatus 3 may be provided as a separate extended device. In this case, for example, the extended device may be connected to the game apparatus 3 via the extension connector 20. Concretely, the extended device may include components such as the image compression section 27, the high-speed wireless communication module 28 and the antenna 29, and may be removably connected to the extension connector 20. According to this configuration, by connecting the extended device to a game apparatus not including the aforementioned components, the game apparatus can communicate with the image output device 8.

Internal Structure of the Image Output Device 8

Next, the internal structure of the image output device 8 will be described with reference to FIG. 4. FIG. 4 is a block diagram illustrating the configuration of the image output device 8. The image output device 8 includes a power supply section 31, a marker section 32, an antenna 33, a high-speed wireless communication module 34, an image expansion section 35, an AV-IC 36, an AV connector 37, an antenna 38, and a controller communication module 39.

The marker section 32 has a function equivalent to that of the aforementioned marker device 6, and includes, for example, two markers (concretely, more than one infrared LED). The power supply section 31 is connected to the marker section 32 to supply power to the markers in the marker section 32. In the present embodiment, the power supply section 31 supplies power to the marker section 32 when the image output device 8 is powered on. Note that in another embodiment, the power supply section 31 may determine whether or not to supply power to the marker section 32 in accordance with an instruction from the game apparatus 3. Also, in another embodiment, the image output device 8 does not include the function of the marker device 6 (the functions of the power supply section 31 and the marker section 32), and the image output device 8 and the marker device may be separate devices.

The high-speed wireless communication module 34 wirelessly communicates with the game apparatus 3 (concretely, the high-speed wireless communication module 28 in the game apparatus 3) via the antenna 33. In the case where image data and audio data are transmitted from the game apparatus 3, the high-speed wireless communication module 34 receives the image data and the audio data via the antenna 33 and outputs the received data to the image expansion section 35. The image expansion section 35 performs a predetermined expansion process on the image data (and the audio data) from the high-speed wireless communication module 34 and outputs the processed data to the AV-IC 36. The AV-IC 36 functions in the same manner as the AV-IC 15 of the game apparatus 3, and the AV connector 37 functions in the same manner as the AV connector 16 of the game apparatus 3. Specifically, the AV-IC 36 outputs the image data to the second display 9 via the AV connector 16 and the audio data to the speaker 9a included in the second display 9. As a result, an image is displayed on the second display 9 and audio is outputted from the speaker 9a. Note that the AV connectors 16 and 36 may be connectors capable of providing output to a plurality of destinations. Also, in another embodiment, the second display 9 and the speaker 9a may be included in the image output device 8, and in this case, the AV connector 36 is not provided, so that images and audio may be outputted via internal wiring of the image output device 8. However, even in such a case, the image output device 8 may be provided with another AV connector for external output.

The controller communication module 39 functions in the same manner as the controller communication module 19 in the game apparatus 3. Specifically, the controller communication module 39 receives operation data transmitted from the second controller 7 via the antenna 38. The received operation data is outputted to the high-speed wireless communication module 34 and then transmitted to the game apparatus 3 by the high-speed wireless communication module 34 via the antenna 33. In this manner, in the present embodiment, operation data from the controller is transmitted to the game apparatus 3 by the high-speed wireless communication module 34, but in another embodiment, the operation data may be transmitted to the game apparatus 3 by a wireless communication module different from the high-speed wireless communication module 34. By transmitting operation data to the game apparatus 3 using a wireless communication module for receiving image data (and audio data) from the game apparatus 3 as in the present embodiment, it becomes possible to simplify the configuration of the image output device 8.

Note that the image output device is provided with a power switch (not shown). The image output device 8 is powered on/off via the power switch. Also, as will be described in detail later, the image output device 8 can be remotely powered on/off by pressing the power button of the controller 5 or 7, as in the case of the game apparatus 3.

As described above, the configuration shown in FIG. 4 allows the image output device 8 to display game images from the game apparatus 3 on the second display 9. Note that in the present embodiment, the image output device 8 has both the function of the marker device 6 and the function of receiving image data and causing the display to display the data, but in another embodiment, only the function of receiving image data and causing the display to display the data may be provided. Specifically, in another embodiment, the image output device 8 does not have to include the power supply section 31 and the marker section 32. In this case, the game system 1 requires a separate marker device including the power supply section 31 and the marker section 32. In the present embodiment, the two functions mentioned above are integrated into one device, thereby reducing the number of devices installed around the second display 9, resulting in easy device installation and simplified wiring.

Configuration of the Controller 5

Figure 5:
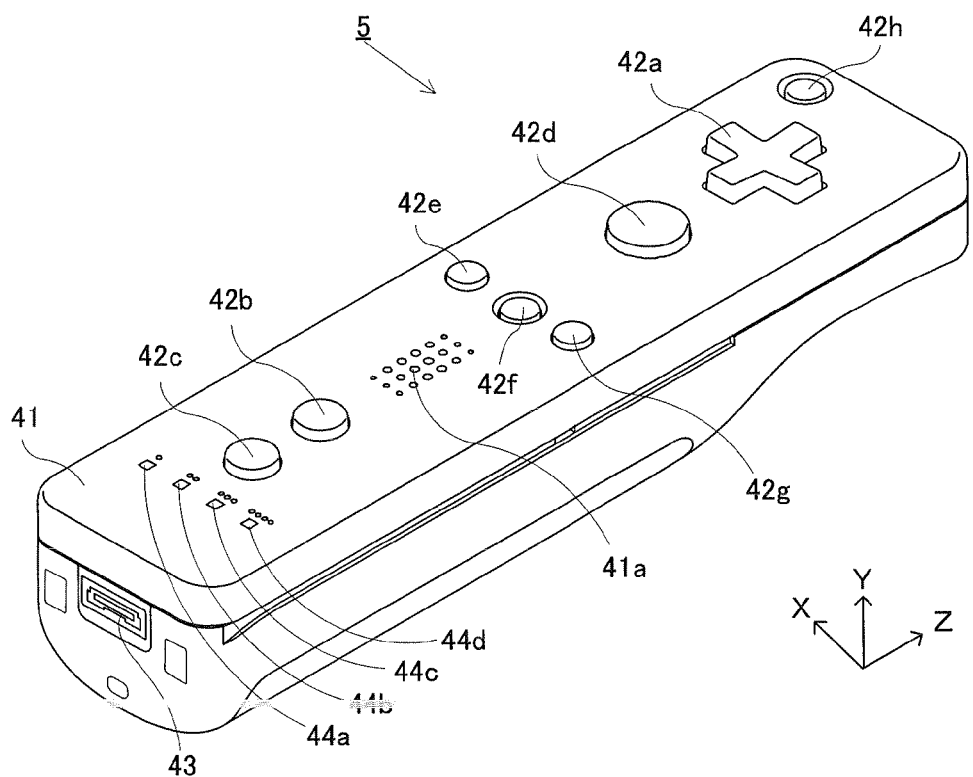
FIG. 5 is a perspective view illustrating the external appearance of a first controller 5.
Figure 6:
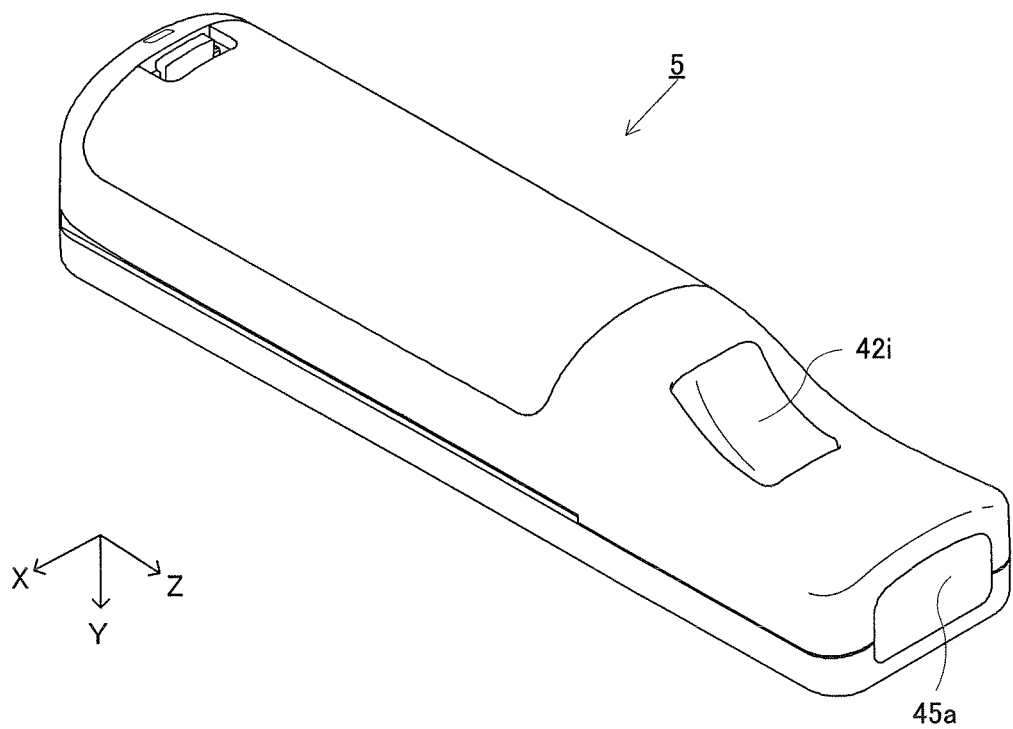
FIG. 6 is another perspective view illustrating the external appearance of the first controller 5.

Next, with reference to FIGS. 5 to 9, the first controller 5 will be described. FIGS. 5 and 6 are perspective views illustrating the external appearance of the first controller 5. The perspective view of FIG. 5 shows the first controller 5 as viewed from the top rear side thereof, and the perspective view of FIG. 6 shows the first controller 5 as viewed from the bottom front side thereof.

In FIGS. 5 and 6, the first controller 5 has a housing 41 formed by, for example, plastic molding. The housing 41 has a generally parallelepiped shape extending in a longitudinal direction from front to rear (Z-axis direction shown in FIG. 5), and as a whole is sized to be held by one hand of an adult or even a child. The user (player) can perform game operations by pressing buttons provided on the first controller 5, and moving the first controller 5 to change the position and the orientation thereof.

The housing 41 has a plurality of operation buttons. As shown in FIG. 5, on the top surface of the housing 41, a cross button 42a, a "1" button 42b, a "2" button 42c, an "A" button 42d, a "−" button 42e, a home button 42f, a "+" button 42g, and a power button 42h are provided. The top surface of the housing 41 on which the buttons 42a to 42h are provided may be referred to herein as a "button surface". On the other hand, as shown in FIG. 6, a recessed portion is formed on the bottom surface of the housing 41, and a "B" button 42i is provided on a rear slope surface of the recessed portion. The operation buttons 42a to 42i are assigned, as necessary, their respective functions in accordance with the game program executed by the game apparatus 3. Further, the power button 42h is intended to remotely turn on/off the game apparatus 3. The home button 42f and the power button 42h each have the top surface thereof recessed below the top surface of the housing 41. Therefore, the home button 42f and the power button 42h are prevented from being inadvertently pressed by the user.

On the rear surface of the housing 41, a connector 43 is provided. The connector 43 is used for connecting the first controller 5 to another device. Both sides of the connector 43 on the rear surface of the housing 41 have a fastening hole 43a for preventing easy inadvertent disengagement of the other device.

In the rear-side portion of the top surface of the housing 41, a plurality (four in FIG. 5) of LEDs 44a, 44b, 44c, and 44d are provided. The first controller 5 is assigned a controller type (number) so as to be distinguishable from another main controller. The LEDs 44a, 44b, 44c, and 44d are each used for informing the user of the controller type which is currently being set for the first controller 5, and for informing the user of remaining battery power of the first controller 5, for example. Specifically, when a game operation is performed using the first controller 5, one of the LEDs 44a, 44b, 44c, and 44d that corresponds to the controller type is lit up.

The first controller 5 has an imaging information calculation section 45 (FIG. 8), and a light incident surface 45a through which a light is incident on the imaging information calculation section 45 is provided on the front surface of the housing 41, as shown in FIG. 6. The light incident surface 45a is made of a material transmitting therethrough at least infrared light outputted from the markers 6R and 6L.

On the top surface of the housing 41, sound holes 41a for externally outputting a sound from a speaker 59 (shown in FIG. 7) incorporated in the first controller 5 is provided between the "1" button 42b and the home button 42f.

Figure 7:
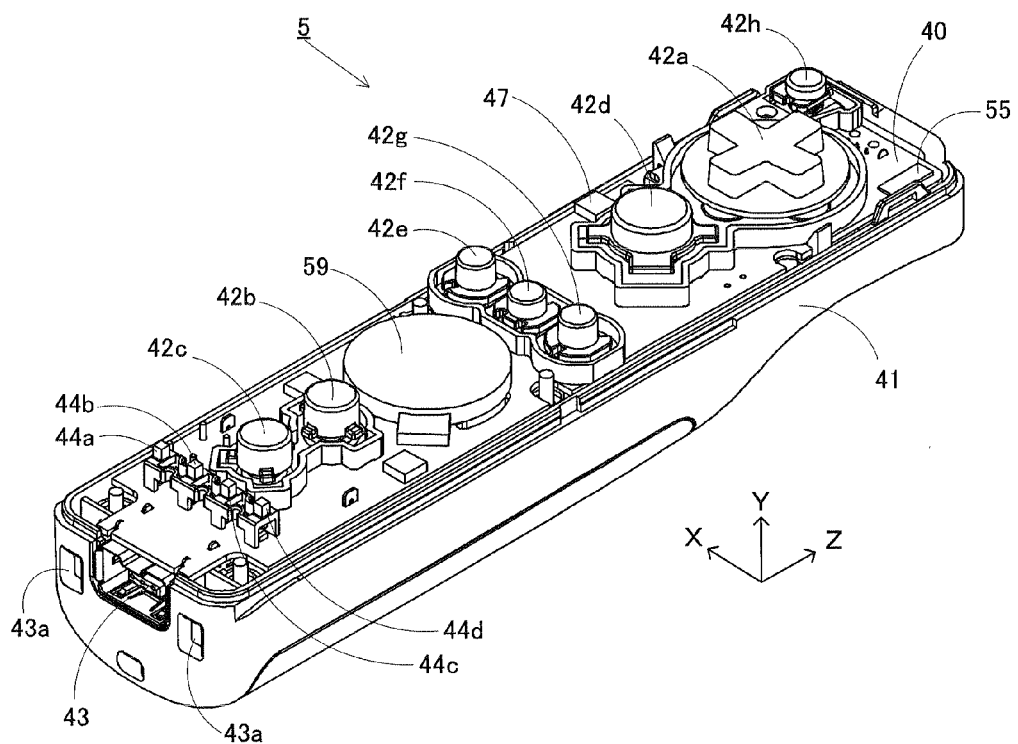
FIG. 7 is a perspective view illustrating the first controller 5 with its upper casing removed.
Figure 8:
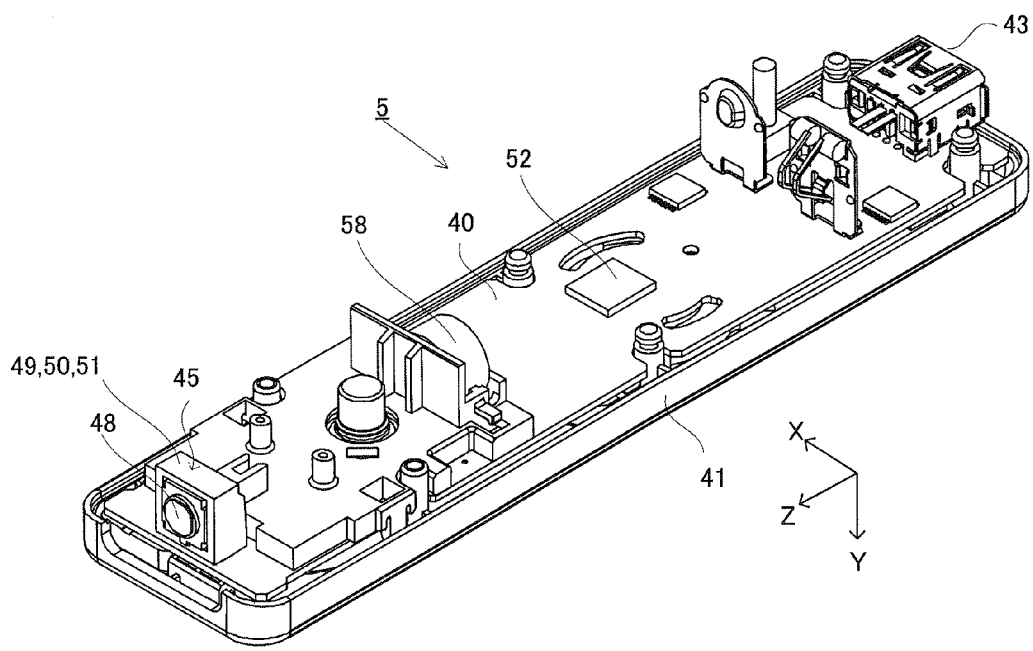
FIG. 8 is a perspective view illustrating the first controller 5 with its lower casing removed.

Next, with reference to FIGS. 7 and 8, an internal structure of the first controller 5 will be described. FIGS. 7 and 8 are diagrams illustrating the internal structure of the first controller 5. FIG. 7 is a perspective view illustrating the first controller 5 with its upper casing (a part of the housing 41) removed. FIG. 8 is a perspective view illustrating the first controller 5 with its lower casing (a part of the housing 41) removed. The perspective view of FIG. 8 shows a substrate 40 of FIG. 7 as viewed from the reverse side.

As shown in FIG. 7, the substrate 40 is fixed inside the housing 41, and on a top main surface of the substrate 40, the operation buttons 42a to 42h, the LEDs 44a, 44b, 44c, and 44d, an acceleration sensor 47, an antenna 55, the speaker 59, and the like are provided. These elements are connected to a microcomputer 52 (see FIG. 8) via lines (not shown) formed on the substrate 40 and the like. In the present embodiment, the acceleration sensor 47 is provided on a position offset from the center of the first controller 5 with respect to the X-axis direction. Thus, calculation of the movement of the first controller 5 being rotated around the Z-axis may be facilitated. Further, the acceleration sensor 47 is provided anterior to the center of the first controller 5 with respect to the longitudinal direction (Z-axis direction). Further, a wireless module 54 (see FIG. 8) and the antenna 55 allow the first controller 5 to act as a wireless controller.

On the other hand, as shown in FIG. 8, at a front edge of a bottom main surface of the substrate 40, the imaging information calculation section 45 is provided. The imaging information calculation section 45 includes an infrared filter 48, a lens 49, an image pickup element 50 and an image processing circuit 51 located in order from the front of the first controller 5. These components 48 to 51 are attached on the bottom main surface of the substrate 40.

On the bottom main surface of the substrate 40, the microcomputer 52 and a vibrator 58 are provided. The vibrator 58 is, for example, a vibration motor or a solenoid, and is connected to the microcomputer 52 via lines formed on the substrate 40 or the like. The first controller 5 is vibrated by actuation of the vibrator 58 based on a command from the microcomputer 52. Therefore, the vibration is conveyed to the user's hand holding the first controller 5, and thus a so-called vibration-feedback game is realized. In the present embodiment, the vibrator 58 is disposed slightly toward the front of the housing 41. That is, the vibrator 58 is positioned offset from the center toward the end of the first controller 5, and therefore the vibration of the vibrator 58 can lead to enhancement of the vibration of the entire first controller 5. Further, the connector 43 is provided at the rear edge of the bottom main surface of the substrate 40. In addition to the components shown in FIGS. 7 and 8, the first controller 5 includes a quartz oscillator for generating a reference clock of the microcomputer 52, an amplifier for outputting a sound signal to the speaker 59, and the like.

FIGS. 5 to 8 show only examples of the shape of the first controller 5, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imagining information calculation section 45 (the light incident surface 45a through which a light is incident on the imaging information calculation section 45) of the first controller 5 may not necessarily be provided on the front surface of the housing 41, but may be provided on any other surface on which a light can be received from the outside of the housing 41.

Figure 9:
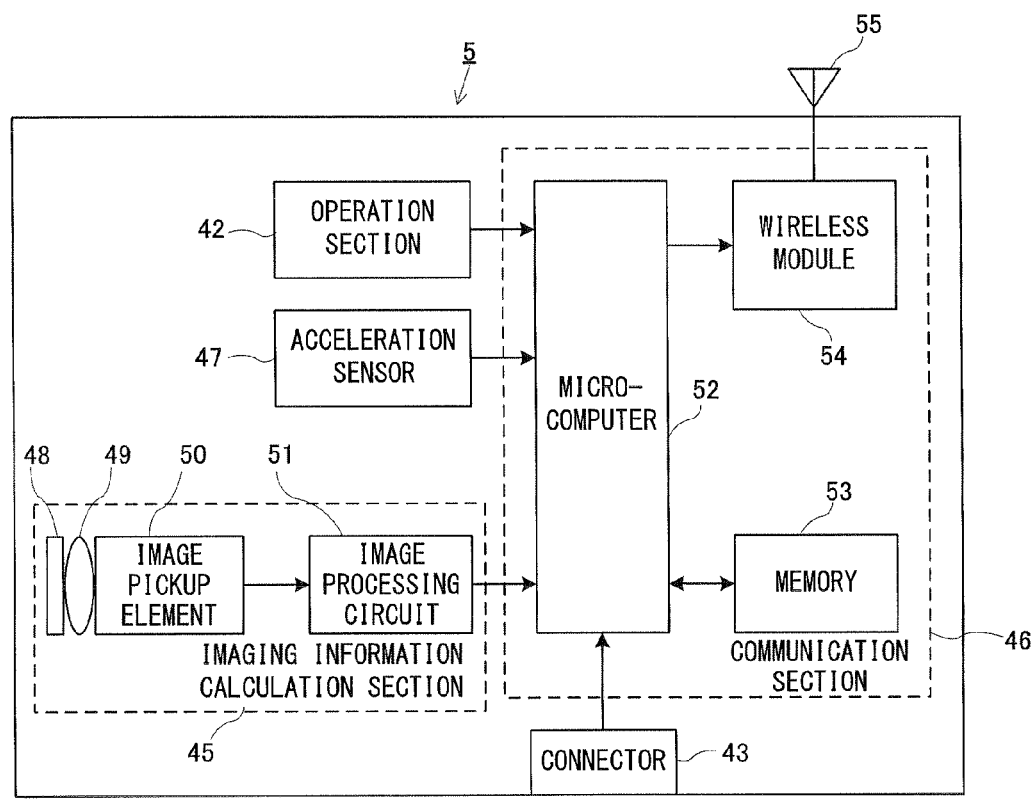
FIG. 9 is a block diagram illustrating the configuration of the first controller 5.

FIG. 9 is a block diagram illustrating the configuration of the first controller 5. The first controller 5 includes an operation section 42 (the operation buttons 42a to 42i), the connector 43, the imaging information calculation section 45, a communication section 46, and the acceleration sensor 47. The first controller 5 transmits, as operation data, data representing the content of an operation performed on the first controller 5 itself, to the game apparatus 3.

The operation section 42 includes the operation buttons 42a to 42i described above, and outputs, to the microcomputer 52 of the communication section 46, operation button data indicating an input state (that is, whether or not each operation button 42a to 42i is pressed) of each operation button 42a to 42i.

The imaging information calculation section 45 is a system for analyzing image data taken by the image pickup means and calculating, for example, the centroid and the size of an area having a high brightness in the image data. The imaging information calculation section 45 has a maximum sampling period of, for example, about 200 frames/sec., and therefore can trace and analyze even a relatively fast motion of the controller.

The imaging information calculation section 45 includes the infrared filter 48, the lens 49, the image pickup element 50 and the image processing circuit 51. The infrared filter 48 transmits therethrough only infrared light included in the light incident on the front surface of the first controller 5. The lens 49 collects the infrared light transmitted through the infrared filter 48 so as to be incident on the image pickup element 50. The image pickup element 50 is a solid-state imaging device such as, for example, a CMOS sensor or a CCD sensor, which receives the infrared light collected by the lens 49, and outputs an image signal. The markers 6R and 6L of the marker device 6 provided near the display screen of the first display 2 each include an infrared LED for outputting an infrared light forward from the first display 2. Therefore, the infrared filter 48 enables the image pickup element 50 to receive only the infrared light transmitted through the infrared filter 48 and generate image data, so that an image of each of the markers 6R and 6L can be taken with enhanced accuracy. Hereinafter, the image taken by the image pickup element 50 is referred to as a pickup image. The image data generated by the image pickup element 50 is processed by the image processing circuit 51. The image processing circuit 51 calculates, in the pickup image, the positions of subjects to be imaged (the marker 6R and the marker 6L). The image processing circuit 51 outputs data representing coordinate points of the calculated positions, to the microcomputer 52 of the communication section 46. The data representing the coordinate points is transmitted as operation data to the game apparatus 3 by the microcomputer 52. Hereinafter, the coordinate points are referred to as "marker coordinate points". The marker coordinate point changes depending on the orientation (angle of tilt) and/or the position of the first controller 5 itself, and therefore the game apparatus 3 is allowed to calculate the orientation and the position of the first controller 5 using the marker coordinate point.

In another embodiment, the first controller 5 may not necessarily include the image processing circuit 51, and the first controller 5 may transmit the pickup image as it is to the game apparatus 3. At this time, the game apparatus 3 may have a circuit or a program, having the same function as the image processing circuit 51, for calculating the marker coordinate point.

The acceleration sensor 47 detects accelerations (including a gravitational acceleration) of the first controller 5, that is, force (including gravity) applied to the first controller 5. The acceleration sensor 47 detects a value of an acceleration (linear acceleration) applied to a detection section of the acceleration sensor 47 in the straight line direction along the sensing axis direction, among all accelerations applied to a detection section of the acceleration sensor 47. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 47 is, for example, an electrostatic capacitance type acceleration sensor. However, another type of acceleration sensor may be used.

In the present embodiment, the acceleration sensor 47 detects a linear acceleration in each of three axis directions, i.e., the up/down direction (Y-axis direction shown in FIG. 5), the left/right direction (the X-axis direction shown in FIG. 5), and the forward/backward direction (the Z-axis direction shown in FIG. 5), relative to the first controller 5. The acceleration sensor 47 detects an acceleration in the straight line direction along each axis, and an output from the acceleration sensor 47 represents a value of the linear acceleration for each of the three axes. In other words, the detected acceleration is represented as a three-dimensional vector (ax, ay, az) in an XYZ-coordinate system (controller coordinate system) defined relative to the first controller 5. Hereinafter, a vector representing components of the acceleration values detected for the three axes, respectively, by the acceleration sensor 47 is referred to as an acceleration vector.

Data (acceleration data) representing the acceleration detected by the acceleration sensor 47 is outputted to the communication section 46. The acceleration detected by the acceleration sensor 47 changes depending on the orientation (angle of tilt) and the movement of the first controller 5, and therefore the game apparatus 3 is allowed to calculate the orientation and the movement of the first controller 5 using the acceleration data. In the present embodiment, the game apparatus 3 determines the orientation (angle of tilt) of the first controller 5 based on the acceleration data. That is, the acceleration sensor 47 is used as a sensor for outputting data by which to determine the angle of tilt of the first controller 5.

When a computer such as a processor (for example, the CPU 10) of the game apparatus 3 or a processor (for example, the microcomputer 52) of the first controller 5 processes an acceleration signal outputted from the acceleration sensor 47, additional information relating to the first controller 5 can be inferred or calculated (determined), as one skilled in the art will readily understand from the description herein. For example, in the case where the computer performs processing on the premise that the first controller 5 including the acceleration sensor 47 is in static state (that is, in the case where processing is performed on the premise that the acceleration to be detected by the acceleration sensor includes only the gravitational acceleration), when the first controller 5 is actually in static state, it is possible to determine whether or not, or how much the first controller 5 tilts relative to the direction of gravity, based on the acceleration having been detected. Specifically, when the state where the detection axis of the acceleration sensor 47 faces vertically downward is set as a reference, whether or not the first controller 5 tilts relative to the reference can be determined based on whether or not 1 G (gravitational acceleration) is applied to the detection axis, and the degree to which the first controller 5 tilts relative to the reference can be determined based on the magnitude of the gravitational acceleration. Further, the multiaxial acceleration sensor 47 processes the acceleration signals having been detected for the respective axes so as to more specifically determine the degree to which the first controller 5 tilts relative to the direction of gravity. In this case, the processor may calculate, based on the output from the acceleration sensor 47, the angle at which the first controller 5 tilts, or the direction in which the first controller 5 tilts without calculating the angle of tilt. Thus, the acceleration sensor 47 is used in combination with the processor, making it possible to determine the angle of tilt or the orientation of the first controller 5.

On the other hand, when it is premised that the first controller 5 is in dynamic state (where the first controller 5 is being moved), the acceleration sensor 47 detects the acceleration based on the movement of the first controller 5, in addition to the gravitational acceleration. Therefore, when the gravitational acceleration component is eliminated from the detected acceleration through a predetermined process, it is possible to determine the direction in which the first controller 5 moves. Even when it is premised that the first controller 5 is in dynamic state, the acceleration component based on the movement of the acceleration sensor is eliminated from the detected acceleration through a predetermined process, whereby it is possible to determine the tilt of the first controller 5 relative to the direction of gravity. In another embodiment, the acceleration sensor 47 may include an embedded processor or another type of dedicated processor for performing any desired processing on an acceleration signal detected by the acceleration detection means incorporated therein before outputting to the microcomputer 52. For example, when the acceleration sensor 47 is intended to detect static acceleration (for example, gravitational acceleration), the embedded or dedicated processor could convert the acceleration signal to a corresponding angle of tilt (or another preferable parameter).

Note that in the present embodiment, for example, an electrostatic capacitance-type acceleration sensor is used as the sensor for outputting values fluctuating in accordance with the movement of the controller, but another type of acceleration sensor or a gyroscope may be used. However, it should be noted that the acceleration sensor detects a linear acceleration along each axis, while the gyroscope detects an angular rate for rotation. Specifically, in the case where the gyroscope is employed in place of the acceleration sensor, the nature of signals to be detected is changed, and therefore they cannot be simply replaced with each other. Accordingly, in the case where the gyroscope is used in place of the acceleration sensor to calculate an orientation (angle of tilt), for example, the following changes are made. Specifically, the game apparatus 3 initializes the value of orientation at the start of detection. Then, angular rate data outputted by the gyroscope is integrated. Furthermore, the integration result is used to calculate the amount of orientation change from the initialized orientation value. In this case, the calculated orientation is expressed by an angle.

Note that, as has already been described, in the case where the acceleration sensor is used to calculate the angle of tilt (orientation), the angle of tilt is calculated based on an acceleration vector. Accordingly, the calculated angle of tilt can be expressed by a vector, and therefore the case where the acceleration sensor is used differs from the case where the gyroscope is used in that an absolute direction can be calculated without initialization. Also, the nature of the value calculated as an angle of tilt differs as described above when it is an angle or a vector, and therefore when the acceleration sensor is replaced with the gyroscope, it is necessary to perform predetermined conversion on data for the angle of tilt.

The communication section 46 includes the microcomputer 52, a memory 53, the wireless module 54 and the antenna 55. The microcomputer 52 controls the wireless module 54 for wirelessly transmitting, to the game apparatus 3, data acquired by the microcomputer 52 while using the memory 53 as a storage area in the process. Further, the microcomputer 52 is connected to the connector 43.

Data outputted from the operation section 42, the imaging information calculation section 45, and the acceleration sensor 47 to the microcomputer 52 are temporarily stored to the memory 53. The data are transmitted as the operation data to the game apparatus 3. At the time of the transmission to the controller communication module 19 of the game apparatus 3, the microcomputer 52 outputs the operation data stored in the memory 53 to the wireless module 54. The wireless module 54 uses, for example, the Bluetooth (registered trademark) technology to modulate the operation data onto a carrier wave of a predetermined frequency, and radiates the low power radio wave signal from the antenna 55. That is, the operation data is modulated onto the low power radio wave signal by the wireless module 54 and transmitted from the first controller 5. The controller communication module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 46 to the controller communication module 19 is sequentially performed at a predetermined time interval. Since the game process is generally performed at a cycle of 1/60 sec. (corresponding to one frame time), data is preferably transmitted at a cycle of a shorter time period. The communication section 46 of the first controller 5 outputs, to the controller communication module 19 of the game apparatus 3, the respective operation data at intervals of 1/200 seconds, for example.

The first controller 5 makes it possible for the user to perform an operation of tilting the first controller 5 at an arbitrary angle of tilt in addition to conventional and general game operations of pressing the operation buttons. By the first controller 5, the user can also perform other operations, which include pointing at an arbitrary position on the screen with the first controller 5 and moving the first controller 5 itself.

While the first controller 5 has been described above with reference to FIGS. 5 to 8, in the present embodiment, the second controller 7 is the same as the first controller 5, and therefore any detailed description thereof will be omitted. Note that in another embodiment, the first controller 5 and the second controller 7 are not necessarily input devices of the same type, and they may differ in, for example, the number and arrangement of buttons, the presence or absence of the acceleration sensor 47, and/or the shape of the housing.

Process by the Apparatus and Other Devices in the Game System

Figure 10:
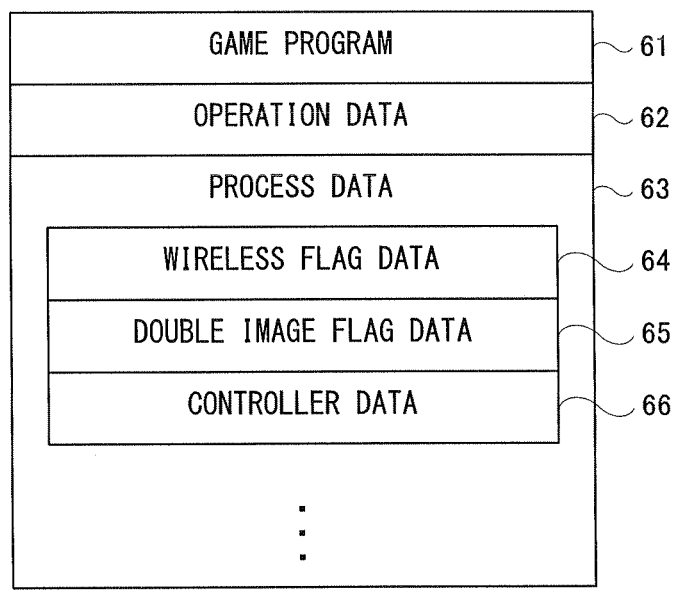
FIG. 10 is a diagram illustrating main data to be stored in memory of the game apparatus.

Next, the process by the game apparatus 3 and other devices in the game system 1 will be described in detail with reference to FIGS. 10 to 14. First, main data used in the process will be described with reference to FIG. 10. FIG. 10 is a diagram illustrating main data to be stored in memory (the external main memory 12, the internal main memory 11e or the flash memory 17) of the game apparatus 3. As shown in FIG. 10, a game program 61, operation data 62, and process data 63 are stored in the memory of the game apparatus 3.

Figure 12:
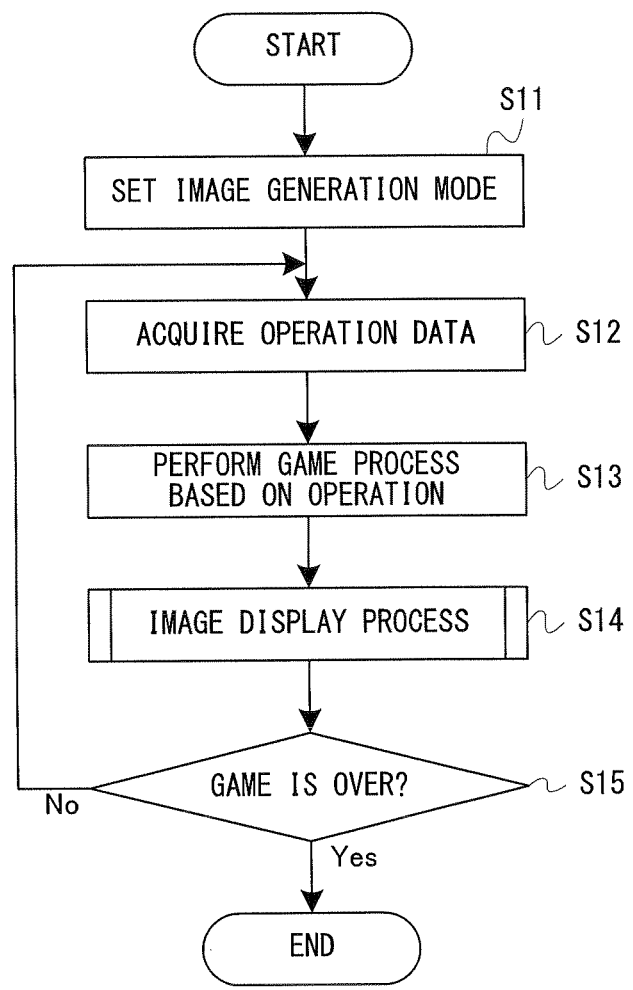
FIG. 12 is a flowchart illustrating a flow of a process performed by the game apparatus executing a game program.

The game program 61 is a program for executing a game process (the process shown in FIG. 12). Part or all of the game program 61 is read from the optical disk 4 and stored to the main memory at an appropriate time after the game apparatus 3 is brought into the aforementioned normal mode.

The operation data 62 is operation data transmitted from the first or second controller 5 or 7 to the game apparatus 3. Note that when a plurality of controllers are wirelessly connected to the game system 1, the same number of pieces of operation data as the controllers are stored into memory. As described above, the operation data is transmitted from the controller to the game apparatus 3 at intervals of 1/200 seconds, and therefore the operation data 62 stored in the main memory is updated at the same intervals. The operation data 62 contains operation button data, marker coordinate data and acceleration data. The operation button data is data representing an input state of each of the operation buttons 42a to 42i. The marker coordinate data represents a coordinate point calculated by the image processing circuit 51 of the imaging information calculation section 45, that is, the data represents the marker coordinate point. The acceleration data is data representing an acceleration (acceleration vector) detected by the acceleration sensor 47.

The process data 63 is data used for a process (FIGS. 11 to 13) by the game apparatus. The process data 63 contains wireless flag data 64, double image flag data 65, and controller data 66. Note that in addition to the data shown in FIG. 10, the process data 63 contains data required for the game process, including image data for various objects appearing in the game and data indicating various parameters for the objects.

The wireless flag data 64 indicates the state (ON or OFF) of the wireless flag. The wireless flag is a flag indicating whether or not to wirelessly transmit an image generated by the game apparatus 3 to the image output device 8. Specifically, in the case of a mode (wireless output mode) in which an image is wirelessly transmitted to the image output device 8, the wireless flag is set to ON, whereas in the case of a mode (non-wireless output mode) in which an image is not wirelessly transmitted to the image output device 8, the wireless flag is set to OFF.

The double image flag data 65 indicates the state (ON or OFF) of the double image flag. The double image flag is a flag indicating whether or not to generate two images resulting from the process by the game apparatus 3. A conceivable example of generating two images is a case where two people play a game. Specifically, two game images are respectively generated based on viewpoints of characters operated by two players (users). When two images are generated, the double image flag is set to ON, and when only one image is generated, the double image flag is set to OFF.

The controller data 66 is data indicating information concerning a controller used for operation. In the present embodiment, the user can use a controller in wireless communication with the game apparatus 3 or the image output device 8 for operation. Specifically, the controller data 66 at least provides controller identification information and information (hereinafter, referred to as "connection information") indicating whether the controller is in communication (wirelessly connected) with the game apparatus 3 or the image output device 8. Note that in the present embodiment, it is assumed that the number of controllers that can be wirelessly connected to the game apparatus 3 or the image output device 8 at the same time is four. Therefore, the controller data 66 stored in memory provides information concerning up to four controllers.

Operations of the Devices when Activating the Game System 1

First, operations of the devices when activating the game system 1 will be described. Here, as described above, both the controllers 5 and 7 have the function of wirelessly communicating with both the game apparatus 3 and the image output device 8. However, the following descriptions will be given with respect to an example where the first controller 5 communicates with the game apparatus 3 and the second controller 7 communicates with the image output device 8. Specifically, in the example, the first controller 5 is used around the game apparatus 3 (typically, in the same room), and the second controller 7 is used around the image output device 8. Note that the game apparatus 3 and the image output device 8 are assumed to be installed in different rooms in a household.

In the present embodiment, to activate the game system 1, the game apparatus 3 or the image output device 8 needs to be powered on. The game apparatus 3 and the image output device 8 can be powered on/off by pressing their respective power buttons provided thereon and also by pressing the power button of the controller 5 or 7. That is, in the present embodiment, the game system 1 can be activated using the controller. The details thereof will be described below.

In the case where the game apparatus 3 is in the sleep mode, when the power button 42h of the first controller 5 is pressed, the first controller 5 transmits to the game apparatus 3 operation data indicating that the power button 42h has been pressed. The controller communication module 19 of the game apparatus 3 receives the operation data transmitted from the first controller 5 via the antenna 23. Upon reception of the operation data, the game apparatus 3 supplies power to each component and transitions to the normal mode. On the other hand, in the case where operation data indicating that the power button has been pressed is received from the first controller 5 during the normal mode, the game apparatus 3 transitions to the sleep mode. Note that the game apparatus 3 can also be powered on/off (switched between the normal mode and the sleep mode) using the power button 24 provided on the game apparatus 3.

On the other hand, the image output device 8 can be remotely powered on/off by pressing the power button of the second controller 7, as in the case of the game apparatus 3. Specifically, power is supplied to the controller communication module 39 of the image output device 8 even when the power is off (sleep mode), and therefore operation data can be received from the second controller 7. In the case where the power button of the second controller 7 is pressed when the power is off, the second controller 7 transmits to the image output device 8 operation data indicating that the power button has been pressed. The controller communication module 39 receives the operation data transmitted from the second controller 7 via the antenna 38. Upon reception of the operation data, the image output device 8 supplies power to each component and transitions to the normal mode. On the other hand, in the case where operation data indicating that the power button has been pressed is received from the second controller 7 when the power is on (normal mode), the image output device 8 is powered off. Note that the image output device 8 can be powered on/off via a power button (not shown) provided on the image output device 8.

When the image output device 8 is powered on/off, the high-speed wireless communication module 34 transmits an instruction to power on/off to the game apparatus 3. Once the high-speed wireless communication module 28 of the game apparatus 3 receives the instruction, the game apparatus 3 is powered on/off in accordance with the instruction (switched between the normal mode and the sleep mode). In this manner, in the present embodiment, an instruction to power on/off from the controller 5 or 7 is directly transmitted to the game apparatus 3 and also transmitted to the game apparatus 3 via the image output device 8. Accordingly, the user can power on/off the game apparatus 3 using the controller even from the image output device 8 located away from the game apparatus 3. Note that in another embodiment, the game apparatus 3 may not necessarily be powered on/off in accordance with a signal from the image output device 8 and may be powered on/off only by the power button 24 provided on the game apparatus 3 (or the power button of the controller).

Also, when the game apparatus 3 is powered on using the controller, the CPU 10 stores the controller data 66 into memory. Specifically, the controller data 66 stored into memory by the CPU 10 is data containing information for identifying the controller operated to power on the game apparatus 3 and information (connection information) indicating whether the controller is in wireless communication with the game apparatus 3 or with the image output device 8. Note that in the case where the game apparatus 3 is powered on by the power switch provided on the game apparatus 3 or the image output device 8, the controller data 66 is not stored at the exact time when the power is turned on.

Process by the Game Apparatus 3 at the Activation of the Normal Mode

Next, the process by the game apparatus 3 during the normal mode (the mode in which power is supplied to each component of the game apparatus 3, thereby bringing the component into normal conductive state) will be described with reference to FIG. 11. When the user gives an instruction to activate the game system 1 during the sleep mode, power is supplied to each component of the game apparatus 3 via an AC adaptor (not shown), so that the normal mode starts. After the start of the normal mode, the CPU 10 and other components of the game apparatus 3 starts performing the process shown in FIG. 11.

Figure 11:
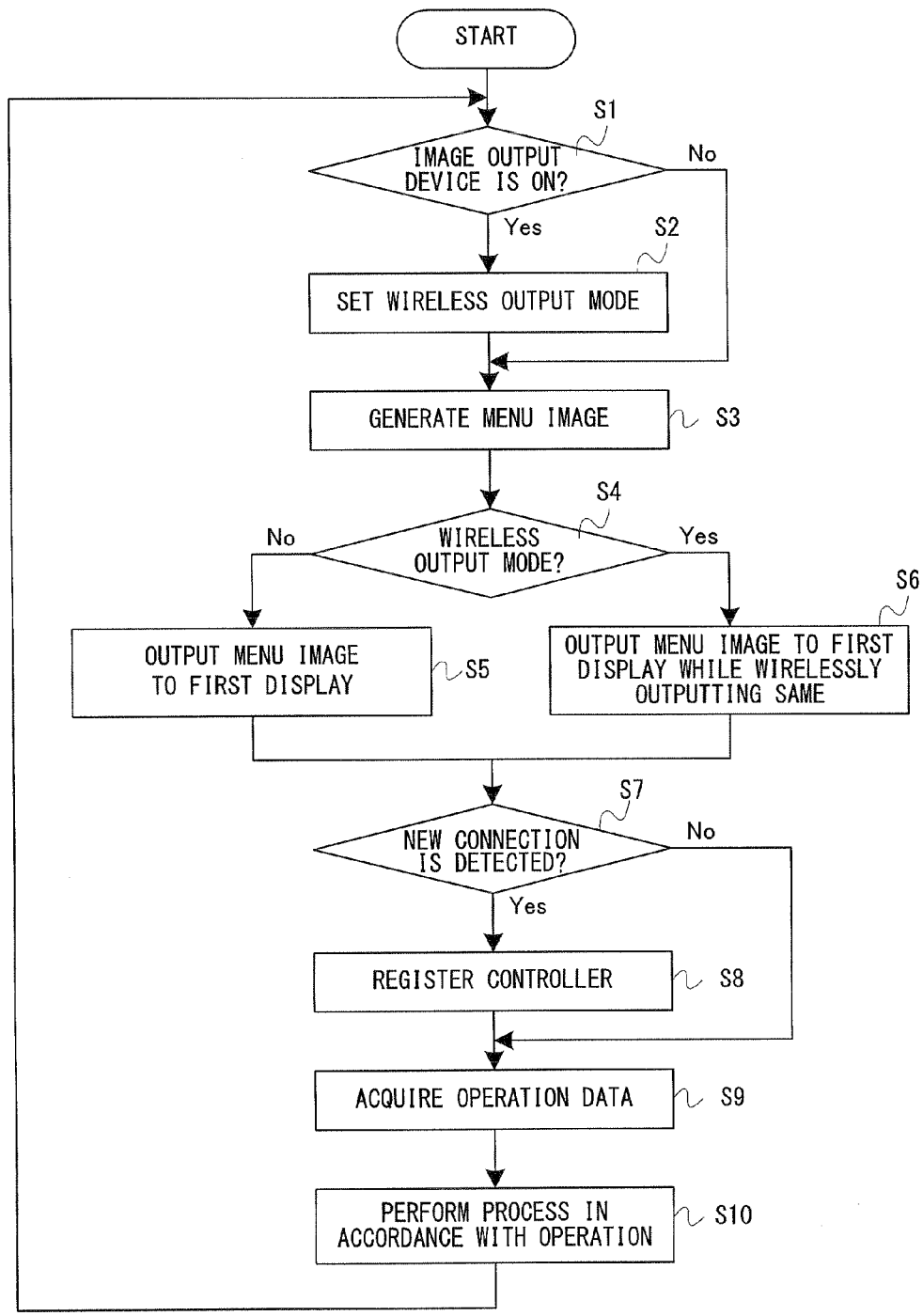
FIG. 11 is a flowchart illustrating a flow of a process by the game apparatus during a normal mode.

FIG. 11 is a flowchart illustrating a flow of the process by the game apparatus 3 during the normal mode. Note that at the start of the series of process steps shown in FIG. 11, data indicating "OFF" is stored into memory as wireless flag data 64. In the series of process steps, firstly, in step S1, the CPU 10 determines whether or not the image output device 8 is on. Here, in the present embodiment, when the image output device 8 is on, the high-speed wireless communication module 34 of the image output device 8 performs a process of establishing wireless communication with the game apparatus 3. Accordingly, the determination of step S1 can be made based on whether or not the game apparatus 3 and the image output device 8 are in communication. That is, the determination process of step S1 is to distinguish whether or not data can be transmitted to the image output device 8. When the determination result of step S1 is affirmative, the process of step S2 is performed. On the other hand, when the determination result of step S1 is negative, the process of step S2 is skipped and the process of step S3 is performed.

In step S2, the CPU 10 sets the mode of the game apparatus 3 with respect to wireless output to the image output device 8 as "wireless output". Specifically, the CPU 10 stores data indicating "ON" into memory as wireless flag data 64. Following step S2, the process of step S3 is performed.

In step S3, the CPU 10 generates menu images. The menu images are images for accepting instructions to start various applications that can be executed by the game apparatus 3 (including a game program application stored in the optical disk 4). The game apparatus 3 can execute a plurality of applications, and generates images (icons) representing the applications as menu images. Note that the CPU 10 may generate a cursor image operable with the controller, which is displayed overlying the menu images. Also, in the case where audio (e.g., BGM or operation sound outputted when any instruction is given by the user) is outputted along with the menu images, the CPU 10 generates the audio. Following step S3, the process of step S4 is performed.

The menu images generated by step S3 are displayed on the first display 2 and/or the second display 9. The input/output processor 11a controls which display presents the menu images (in steps S4 to S6 below). Specifically, in step S4, the input/output processor 11a determines whether or not the wireless output mode is being set. The determination of step S4 is made based on whether or not the wireless flag data 64 stored in memory indicates "ON". When the determination result of step S4 is negative, the process of step S5 is performed. On the other hand, when the determination result of step S4 is affirmative, the process of step S6 is performed.

In step S5, the input/output processor 11a outputs the menu images (and audio) generated in step S3 to the first display 2. Concretely, the menu image data is read by the AV-IC 15 and outputted to the first display 2 via the AV connector 16. Note that the audio data generated in step S3 is read by the AV-IC 15 and outputted to the speaker 2a of the first display 2 via the AV connector 16. In this manner, in step S5, the menu images are displayed only on the first display 2. Following step S5, the process of step S7 to be described later is performed.

On the other hand, in step S6, the input/output processor 11a outputs the menu images (and audio) generated in step S3 to the first display 2 and also wirelessly outputs them to the image output device 8. The process of outputting the menu images to the first display 2 is the same as in step S5. In step S6, the input/output processor 11a further outputs the menu image data to the image compression section 27. In response to the outputting of the menu image data, the image compression section 27 compresses the data by a predetermined method. The high-speed wireless communication module 28 transmits the compressed data to the image output device 8 via the antenna 29. In the image output device 8, the compressed data is received by the high-speed wireless communication module 34 via the antenna 33 and outputted to the image expansion section 35. The image expansion section 35 expands the compressed data. The expanded menu image data is read by the AV-IC 36 and outputted to the second display 2 via the AV connector 37. Through the above process, the menu images are displayed on the second display 9.

Note that the audio data generated in step S3 is transmitted from the high-speed wireless communication module 28 to the image output device 8 via the antenna 29, as in the case of the menu image data. The audio data received by the image output device 8 is read by the AV-IC 36 and outputted to the speaker 9a of the second display 9 via the AV connector 37. Note that, as in the case of the image data, the game apparatus 3 may compress the audio data before transmission to the image output device 8, and in this case, the image output device 8 expands the received (compressed) audio data.

As described above, in step S6, the menu images are displayed on the first display 2 and also on the second display 9. Accordingly, even when the user plays a game where the first display 2 is installed or where the second display 9 is installed, the user can view the menu images. Also, according to the present embodiment, when the image output device 8 is powered on (Yes in step S4), the menu images are displayed on the second display 9, and therefore the user can display the menu images on the second display 9 simply by turning on the image output device 8 without performing any special setting operations. Following step S6, the process of step S7 is performed.

In step S7, the CPU 10 determines whether or not wireless connection with a new controller has been detected. Here, in the present embodiment, when any button on a controller which is not wirelessly connected to the game apparatus 3 or the image output device 8 is pressed, the controller transmits a signal to establish wireless communication. Thereafter, when the game apparatus 3 or the image output device 8 receives the signal, a process of establishing wireless communication with the game apparatus 3 or the image output device 8 is performed. Also, once wireless communication between the new controller and the image output device 8 is established, the image output device 8 transmits a signal indicating the detection of the new controller from the high-speed wireless communication module 34 to the game apparatus 3 via the antenna 33.

Accordingly, in step S7, the CPU 10 determines whether or not wireless communication has been established between the game apparatus 3 and the new controller and also determines whether or not wireless communication has been established between the image output device 8 and the new controller. Note that the later determination can be made based on whether or not the high-speed wireless communication module 28 of the game apparatus 3 has received the signal indicating the detection of the new controller from the image output device 8. When any one of the two determinations is affirmative, the CPU 10 considers the determination result of step S7 to be affirmative. On the other hand, when both of the determinations are negative, the CPU 10 considers the determination result of step S7 to be negative. When the determination result of step S7 is affirmative, the process of step S8 is performed. On the other hand, the determination result of step S7 is negative, the process of step S8 is skipped and the process of step S9 to be described later is performed.

In step S8, the CPU 10 registers the new controller in wireless communication with the game apparatus 3 or the image output device 8. Specifically, controller data 66, which indicates information concerning the new controller (controller identification information and information indicating whether the game apparatus 3 or the image output device 8 is in communication with the controller), is stored into memory. Following step S8, the process of step S9 is performed.

As described above, in the present embodiment, the controller to be used for an operation to display menu images may communicate with either the game apparatus 3 or the image output device 8, and the user can decide which one of the game apparatus 3 and the image output device 8 is to be communicated with the controller. Accordingly, in some cases, all controllers available for operation might communicate with one of the game apparatus 3 and the image output device 8 and no controller might communicate with the other. Specifically, the game system 1 according to the present embodiment can be used in both cases where a user is in a room with the game apparatus 3 and another user is in a room with the image output device 8, and where a user is in one room and no user is in the other.

In step S9, the CPU 10 acquires operation data from the controller. In the present embodiment, there are two routes to acquire the operation data: direct transmission from the controller to the game apparatus 3; and indirect transmission from the controller to the game apparatus 3 via the image output device 8. In step S9, the CPU 10 acquires the operation data from the controller via both of the two routes. Specifically, when the first controller 5 is available for communication with the game apparatus 3, the CPU 10 receives operation data transmitted from the first controller 5 at the controller communication module 19 and stores the received data into memory. Also, when the second controller 7 is available for communication with the image output device 8, the controller communication module 39 of the image output device 8 receives operation data from the second controller 7 and the high-speed wireless communication module 34 transmits the operation data to the game apparatus 3. The CPU 10 receives the operation data transmitted from the image output device 8 at the high-speed wireless communication module 28 and stores the received data into memory. Following step S9, the process of step S10 is performed.

Note that in the present embodiment, when transmitting the operation data received from the second controller 7 to the game apparatus 3, the image output device 8 transmits the received operation data without modification. Here, in another embodiment, the image output device 8 may subject the operation data received from the second controller 7 to some processing before transmitting the data to the game apparatus 3. For example, in some cases, acceleration data and marker coordinate data contained in the operation data might be processed so that an acceleration value indicated by the acceleration data or a coordinate value indicated by the marker coordinate data is corrected in a predetermined manner for use in a game process. The image output device 8 may subject the received operation data to such a correction process and then transmit the corrected operation data to the game apparatus 3.

In step S10, the CPU 10 performs a process in accordance with an operation using the controller. While any operation is possible to display the menu images, for example, the operation may be performed by, for example, moving a cursor displayed overlying the menu images or executing any one of the applications displayed as the menu images. Note that in step S10, a game program stored in the optical disk 4 can be executed, and a process to be performed by executing the game program will be described in detail later. Following step S10, the process of step S1 is performed. Thereafter, the processes of steps S1 to S10 are repeatedly performed until the game apparatus 3 is powered off.

As described above, in the case where menu images are displayed, the menu images are displayed on the first display 2, and if the image output device 8 is on, the menu images are displayed on the second display 9 as well. Accordingly, the user can view the menu images both when the game is played where the first display 2 is installed and when the game is played where the second display 9 is installed. In this manner, according to the present embodiment, the user can readily change the display device for game use (the first display 2 or the second display 9) without taking any trouble to change wiring, for example.

Process by Executing the Game Program

Next, a process by the game apparatus 3 executing a game program stored in the optical disk 4 will be described with reference to FIGS. 12 to 14. FIG. 12 is a flowchart illustrating a flow of a process performed by the game apparatus 3 executing a game program. When the user gives an instruction to execute a game program while the menu images are being displayed (FIG. 11), the game apparatus 3 starts executing the game program. Specifically, units including the main memory are initialized to load the game program therein, and the CPU 10 starts executing the program. The flowchart shown in FIG. 12 illustrates a process to be performed upon completion of the aforementioned process.

In the process shown in FIG. 12, first, in step S11, the CPU 10 sets an image generation mode. Here, in the present embodiment, there are two modes of generating game images (two image generation modes) "single image" and "double image" modes. The single image mode is a mode in which a single image is generated through a process by the game apparatus 3, while the double image mode is a mode in which two images are generated through a process by the game apparatus 3. In step S11, a determination is made as to whether the image generation mode is set as "single image" or "double image". Note that in the present embodiment, the CPU 10 automatically sets the image generation mode as "single image" if the wireless output mode is not being set. In this case, only the first display 2 is used, and therefore it is not necessary to generate two images.

The image generation mode may be set in an arbitrary manner, e.g., it may be set in accordance with an instruction from the player (user). Also, the image generation mode may be set based on, for example, the aforementioned connection information for the controller for use in operation (based on whether the controller is wirelessly connected to the game apparatus 3 or the image output device 8). Specifically, the CPU 10 references the controller data 66 stored in memory to identify the connection information of the controller. Then, if all controllers are wirelessly connected to one of the game apparatus 3 and the image output device 8, the single image mode is set. In this case, the player does not use the other one that is not wirelessly connected to any controller because only one display is presumably used. On the other hand, if any controller is wirelessly connected to the game apparatus 3 and another controller is wirelessly connected to the image output device 8, the double image mode is set. In this case, both of the two displays are presumably used.

Also, in the present embodiment, the image generation mode is set only at the beginning of the game (at the beginning of the process shown in FIG. 12). Here, in another embodiment, the image generation mode may be set in the middle of the game (during a process loop of steps S12 to S15). For example, when the player gives a predetermined instruction during the game, the CPU 10 may change the setting of the image generation mode. Also, in another embodiment, the image generation mode may be set before the game is started (e.g., while menu images are being displayed).

In step S11, when the image generation mode is set as "single image", the CPU 10 stores data indicating "OFF" into memory as double image flag data 65. On the other hand, when the image generation mode is set as "double image", the CPU 10 stores data indicating "ON" into memory as double image flag data 65. Following step S11, the process of step S12 is performed.

In step S12, the CPU 10 acquires operation data. The process of step S12 is the same as the above-described process of step S9, and the CPU 10 acquires the operation data from both a controller that can directly communicate with the game apparatus 3 and a controller that can indirectly communicate with the game apparatus 3 via the image output device 8. Following step S12, the process of step S13 is performed.

In step S13, the CPU 10 performs a game process based on the game operation (the operation data acquired in step S12). While any concrete process may be performed in step S13, for example, the action of a game character to be operated by the player may be controlled, or if a cursor is displayed as a game image, the cursor may be moved. Note that in the present embodiment, the marker (the marker section 32 of the image output device 8) is provided to the second display 9, as in the case of the first display 2, and therefore the CPU 10 can perform a game process based on marker coordinate data in both cases where either of the two displays 2 and 9 is used. Also, in step S13, in addition to the game process based on a game operation, a process that is not directly related to the game operation (e.g., a process of automatically controlling the action of another game character appearing in the game space) may be performed. Following step S13, the process of step S14 is performed.

In step S14, the CPU 10 performs an image display process. The image display process is a process of generating and displaying an image representing game conditions (e.g., an image representing the game space in which the player character appears) based on the game process of step S13. Hereinafter, the image display process will be described in detail with reference to FIG. 13.

Figure 13:
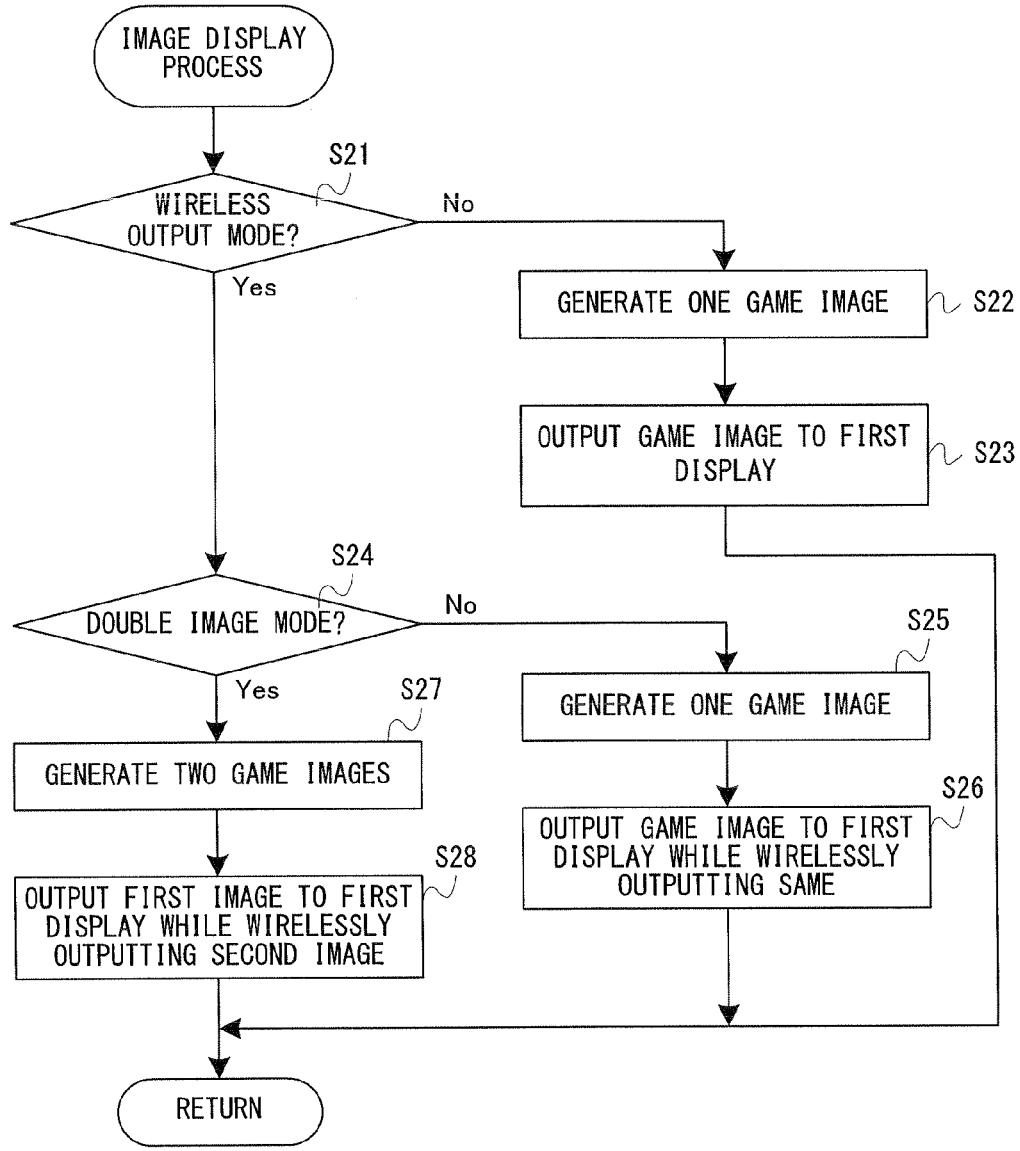
FIG. 13 is a flowchart illustrating a flow of an image display process (step S14) shown in FIG. 12.

FIG. 13 is a flowchart illustrating a flow of the image display process (step S14) shown in FIG. 12. In the image display process, first, in step S21, the CPU 10 determines whether or not the wireless output mode is being set. The determination of step S21 is made based on whether or not the wireless flag data 64 stored in memory indicates "ON", as in the determination of step S4. When the determination result of step S21 is negative, the processes of steps S22 and S23 are performed. On the other hand, when the determination result of step S21 is affirmative, the process of step S24 to be described later is performed.

In step S22, the CPU 10 generates a game image. Any game image may be generated in step S22, e.g., a game space image including the player character is generated. Note that when there are a plurality of player characters, a game image including all the player characters is preferably generated. For example, the CPU 10 may control the area (display area) of the game space that is to be displayed as a game image so that all the player characters are included in the image or the CPU 10 may generate a game image for one screen composed of a plurality of images including the player characters (i.e., a game image for one screen being divided into a plurality of sections). Also, in step S22, the CPU 10 generates game audio corresponding to the game image. Following step S22, the process of step S23 is performed.

In step S23, the CPU 10 outputs the game image generated in step S22 to the first display 2. Concretely, the CPU 10 outputs the game image data from the AV-IC 15 to the first display 2 via the AV connector 16. As a result, the game image is displayed on the first display 2. Note that the image output device 8 is not used in step S23, and therefore the game image is not displayed on the second display 9. Also, in the present embodiment, the game image is outputted to the first display 2, and game audio is outputted to the speaker 2a of the first display 2 and produced therefrom. Following step S23, the CPU 10 ends the image display process.

On the other hand, in step S24, the CPU 10 determines whether or not the image generation mode is set to "double image". The determination of step S21 can be made based on whether the double image flag data 65 stored in memory indicates "ON" or "OFF". When the determination result of step S24 is negative, the processes of steps S25 and S26 are performed. On the other hand, when the determination result of step S24 is affirmative, the processes of steps S27 and S28 to be described later are performed.

In step S25, the CPU 10 generates a game image. The process of step S25 is the same as that of step S22. In step S26, following step S25, the CPU 10 outputs the game image generated in step S22 to the first display 2 and also wirelessly outputs the same image to the image output device 8. Concretely, data for the game image and game audio is outputted to the first display 2 and the speaker 2a in the same manner as in step S23. Furthermore, the game image data is compressed by the image compression section 27 and then transmitted to the image output device 8 by the high-speed wireless communication module 28 via the antenna 29. In the image output device 8, the high-speed wireless communication module 34 receives the game image data via the antenna 33. The received game image data is expanded by the image expansion section 35 and then outputted from the AV-IC 36 to the second display 9 via the AV connector 37. As a result, the game image is displayed on the second display 9. Note that in the present embodiment, the game audio data, along with the game image data, is also transmitted from the game apparatus 3 to the image output device 8, and outputted to the speaker 9a of the second display 9 by the image output device 8. After step S26, the CPU 10 ends the image display process.

On the other hand, in step S27, the CPU 10 generates two game images. One of the two game images generated in step S27 is a first game image to be displayed on the first display 2, and the other is a second game image to be displayed on the second display 9. While any two arbitrary images may be generated, for example, when there are two players, the CPU 10 may generate two game images corresponding to the players. More concretely, the CPU 10 may generate a game image including a player character operated by one player as a first game image and a game image including a player character operated by the other player as a second game image. Note that which game image is set as the first or second game image can be determined based on the aforementioned connection information indicated by the controller data 66. Specifically, by referencing the connection information, it is possible to identify which controller is wirelessly connected to the game apparatus 3 or the image output device 8. Accordingly, the CPU 10 sets a game image including a player character that can be operated by a controller wirelessly connected to the game apparatus 3 as a first game image and a game image including a player character that can be operated by a controller wirelessly connected to the image output device 8 as a second game image. In this manner, in step S27, two game images may be generated based on the connection information indicated by the controller data 66.

Also, in step S27, the CPU 10 generates two types of game audio in accordance with the two game images. Game audio corresponding to the first game image is outputted to the speaker 2a in the same manner as in step S22. Game audio corresponding to the second game image is outputted to the image output device 8 in the same manner as in step S26, and then outputted to the speaker 9a. Following step S27, the process of step S28 is performed.

In the example described above, two game images respectively corresponding to two players are generated, while in another embodiment, two game images may be generated for one player (specifically, in step S11, even when only one controller is used for the game, the image generation mode may be set as "double image"). For example, in order to allow a player to readily recognize the position of a player character in a game space, the CPU 10 may generate two game images, one representing a relatively wide area in the game space and the other representing a relatively narrow area in the game space.

In step S28, the CPU 10 outputs one of the two game images generated in step S27 to the first display 2 and wirelessly outputs the other image to the image output device 8. Specifically, the CPU 10 outputs the first game image to the first display 2 and wirelessly outputs the second game image to the image output device 8. The specific process operation of outputting the game images in step S28 are the same as the aforementioned process in step S26, except that the game images are different. Through step S28, the first game image is displayed on the first display 2, and the second game image is displayed on the second display 9. After step S28, the CPU 10 ends the image display process.

Returning to the description of FIG. 12, the process of step S15 is performed following the image display process of step S14. Specifically, in step S15, the CPU 10 determines whether or not to end the game. The determination of step S15 is made based on, for example, whether or not the game has been cleared, whether or not the game is over, or whether or not the player has given an instruction to stop the game. When the determination result of step S15 is negative, the process of step S12 is performed again. Thereafter, until the game is determined to be ended in step S15, the process loop of steps S12 to S15 is repeatedly performed. On the other hand, when the determination result of step S15 is affirmative, the CPU 10 ends the process shown in FIG. 12.

FIG. 14 is a diagram showing for each usage pattern a game image/game images to be displayed on the two displays through the process shown in FIG. 12. Here, the present game system 1 shown in FIG. 14 can be used in four patterns referred to as "first to fourth usage patterns".

The first usage pattern is a pattern in which the image output device 8 is not used. In this case, the image output device 8 is powered off, and therefore the wireless flag is set to "OFF". Accordingly, the determination result of step S21 is negative, and game image "A" is outputted and displayed only on the first display 2.

The second usage pattern is a pattern in which the image output device 8 is used and the first display 2 is not used for playing a game (i.e., the first display 2 is powered off or used for another purpose). In this case, the image output device 8 is powered on, and therefore the wireless flag is set to "ON". Also, since the first display 2 is not used for playing a game, no controller is wirelessly connected to the game apparatus 3 and the image generation mode is set as "single image". Accordingly, the determination results of steps S21 and S24 are affirmative and negative, respectively, so that game image "A" is outputted to each of the displays 2 and 9. However, in the second usage pattern, since the first display 2 is not used for playing a game, no game image is displayed on the first display 2 (although it is outputted thereto). Consequently, game image "A" is displayed only on the second display 9.

The third usage pattern is a pattern in which the image output device 8 is used and the two displays 2 and 9 are used for playing a game. However, in the third usage pattern, the image generation mode is set as "single image". In this case, the determination results of steps S21 and S24 are affirmative and negative, respectively, as in the second usage pattern, so that game image "A" is outputted to each of the displays 2 and 9. Also, in the third usage pattern, the first display 2 is used for playing a game and therefore the same game image "A" is displayed on each of the displays 2 and 9.

The fourth usage pattern is a pattern in which the image output device 8 is used and the two displays 2 and 9 used for playing a game. However, in the fourth usage pattern, the image generation mode is set as "double image". In this case, the determination results of steps S21 and S24 are both affirmative, so that game image "A" is outputted to the first display 2 and game image "B" (different from game image "A") is outputted to the second display 9. Accordingly, in the fourth usage pattern, game image "A" is displayed on the first display 2, and game image "B" is displayed on the second display 9.

Note that in the present embodiment, the game apparatus 3 always outputs a game image to the first display 2, but in another embodiment, the game apparatus 3 may stop outputting the game image to the first display 2 when any predetermined event occurs. For example, the CPU 10 may determine whether or not to output the game image to the first display 2 based on the connection information indicated by the controller data 66. Concretely, the CPU 10 may determine whether or not any controller is wirelessly connected to the game apparatus 3 based on the connection information, and if no controller is wirelessly connected to the game apparatus 3, the game apparatus 3 may stop outputting the game image to the first display 2.

In this manner, the present embodiment allows the user (player) to use the game system 1 in the first usage pattern where the first display 2 is used for playing a game or in the second usage pattern where the second display 9 is used for playing a game, as shown in FIG. 14. Specifically, the present embodiment allows the user to freely select the first display 2 or the second display 9 for game use without changing any wiring of the game apparatus 3 and the displays, so that the display devices for game use can be readily changed.

Also, the present embodiment allows the user to use the game system 1 in the third usage pattern where the displays 2 and 9 both display the same game image or in the fourth usage pattern where the displays 2 and 9 display their respective different game images, as shown in FIG. 14. Specifically, the present embodiment allows the user to play a game with one game apparatus and a plurality of display devices.

OTHER EMBODIMENTS

The above embodiment is merely an illustrative example of carrying out the present invention, and in another embodiment, the present invention can be carried out with a configuration to be described below, for example.

Variant on Wireless Communication by the Controller

Figure 15:
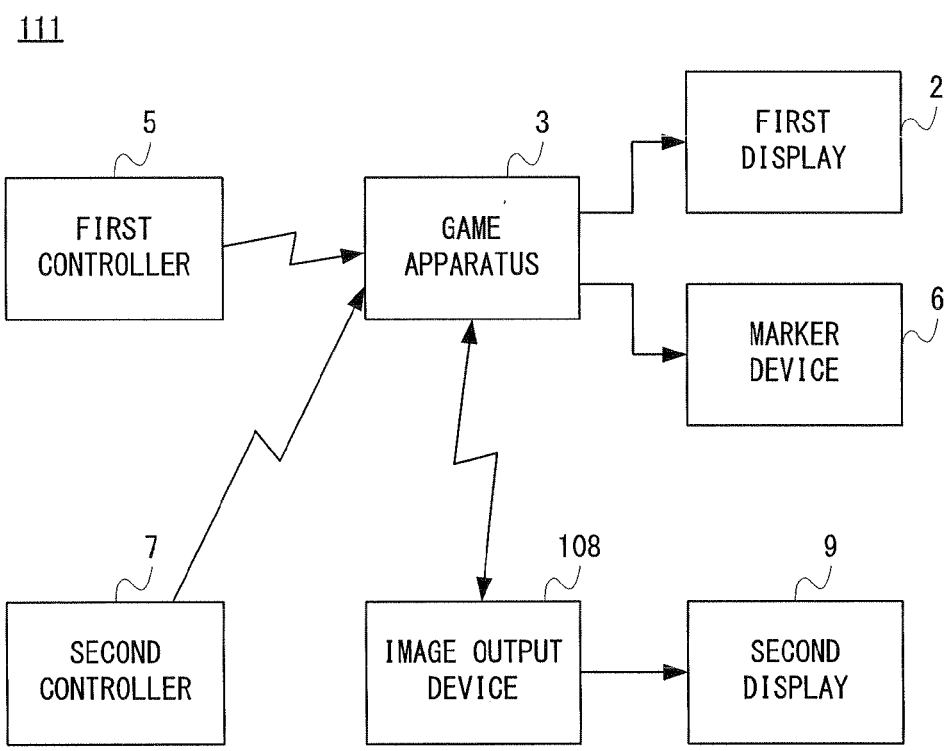
FIG. 15 is a block diagram illustrating connections between devices included in a game system according to a first variant.

In the above embodiment, the controller is capable of wirelessly communicating with the game apparatus 3 and the image output device 8, while in another embodiment, it may be capable of wirelessly communicating only with the game apparatus 3. FIG. 15 is a block diagram illustrating connections between devices included in a game system 111 according to a first variant. In FIG. 15, the game system 111 includes a first display 2, a game apparatus 3, an optical disk 4, a first controller 5, a marker device 6, a second controller 7, an image output device 108, and a second display 9. Note that in FIG. 15, the same elements as those in FIG. 2 are denoted by the same reference characters, and any detailed descriptions thereof are omitted.

In the game system 111 shown in FIG. 15, the image output device 108 does not have any function of wirelessly communicating with the controllers. Accordingly, the second controller 7 wirelessly communicates with the game apparatus 3. In this case, the second controller 7, which is used around the image output device 108, needs to wirelessly communicate with the game apparatus 3 located afar (when compared to the image output device 108). Accordingly, in the case of the game system 111, communication coverage between the controller and the game apparatus 3 is preferably set to such an extent that communication is possible even when the controller and the game apparatus 3 are positioned in separate rooms (e.g., in the tens of meters). Note that in another embodiment, a controller capable of wirelessly communicating only with the game apparatus 3 and another controller capable of wirelessly communicating with both the game apparatus 3 and the image output device 8 may be used.

Variant without any Display Device Connected to the Game Apparatus

Figure 16:
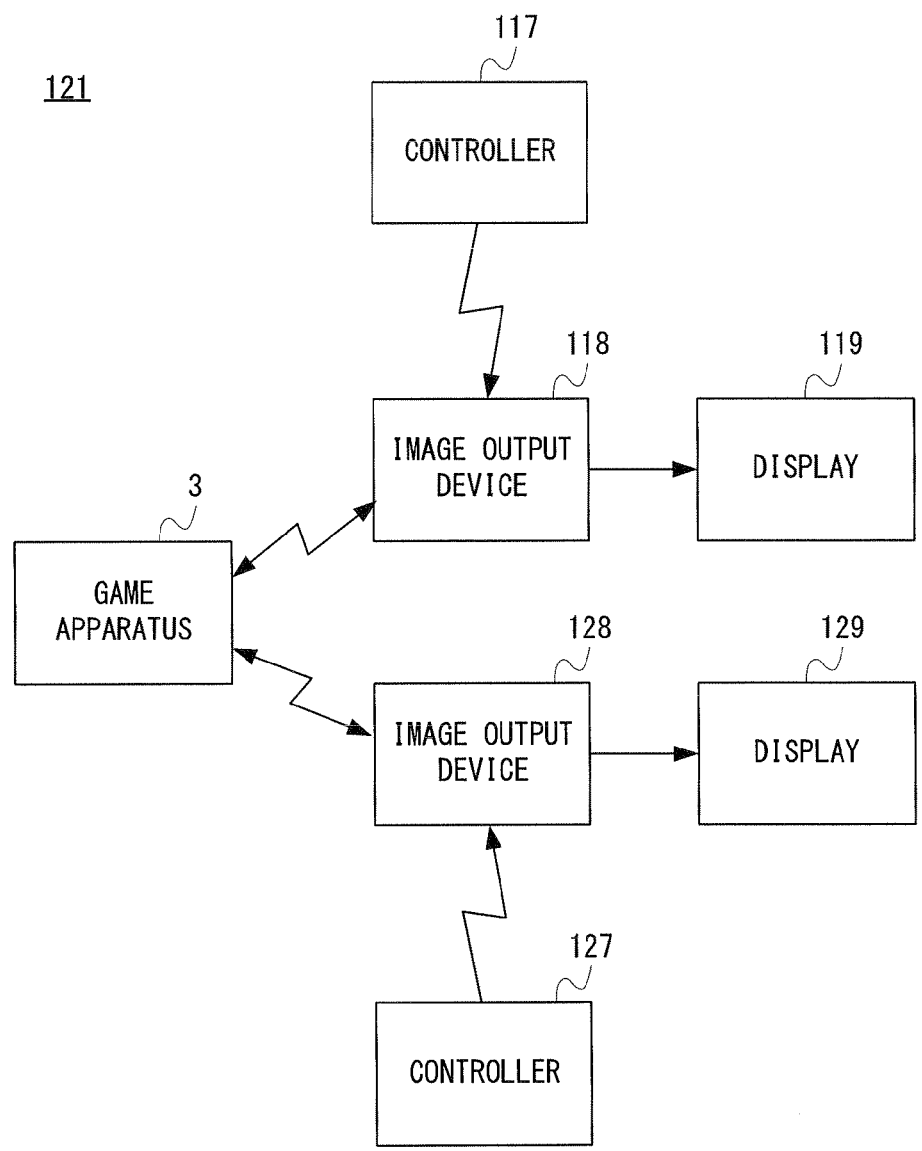
FIG. 16 is a block diagram illustrating connections between devices included in a game system according to a second variant.

In the above embodiment, the game system 1 includes a display device (first display 2) connected to the game apparatus 3. Here, in another embodiment, the game system may have no display device connected to the game apparatus 3. FIG. 16 is a block diagram illustrating connections between devices included in a game system 121 according to a second variant. In FIG. 16, the game system 121 includes a game apparatus 3, two controllers 117 and 127, two image output devices 118 and 128, and two displays 119 and 129. Note that the image output devices 118 and 128 are of the same type as the image output device 8 in the above embodiment, and the controllers 117 and 127 are of the same type as the controller 5 or 7 in the above embodiment.

In the game system 121 shown in FIG. 16, the process operations of the controller 117, the image output device 118, and the display 119 are the same as those of the second controller 7, the image output device 8 and the second display 9, respectively, in the above embodiment. Furthermore, the process operations of the controller 127, the image output device 128 and the display 129 are also the same as those of the second controller 7, the image output device 8 and the second display 9, respectively, in the above embodiment. Accordingly, in the game system 121, an image can be displayed on each of the displays 119 and 129, as in the game system 1 according to the above embodiment. Note that the image output devices 118 and 128 may wirelessly connect with the displays 119 and 129, respectively. Also, in the second variant, the game apparatus 3 wirelessly communicates with each of the image output devices 118 and 128, and in this case, the game apparatus 3 may wirelessly communicate with the image output devices 118 and 128 using time- or frequency-division technology.

Also, in FIG. 16, the CPU 10 of the game apparatus 3 may generate a plurality of different images corresponding to the image output devices 118 and 128, as in step S27. Furthermore, the image output devices 118 and 128 may receive their respective corresponding images transmitted by the high-speed wireless communication module 28. As a result, in the second variant also, different images can be displayed on the display devices. Note that while two sets of image output devices and displays are shown in FIG. 16, three or more sets of image output devices and displays may be used. By increasing the number of sets of image output devices and displays, it is possible to increase the number of display devices that can be used at the same time. Also, when three or more display devices are used in the game system, the game apparatus 3 may generate three or more images in step S27. Also, more than one image output device may be used in the game system 111 shown in FIG. 15.

Also, in FIG. 16, the controllers 117 and 127 wirelessly communicate with the image output devices 118 and 128, respectively. Here, in another embodiment, the controllers 117 and 127 may wirelessly communicate with the game apparatus 3. That is, the image output devices are not necessarily required to have the function of wirelessly communicating with the controllers.

As described above, the present invention is applicable to, for example, household game systems for the purpose of, for example, playing a game using one game apparatus with a plurality of display devices.

While the invention has been described in detail, the foregoing description is in all aspects illustrative and not restrictive. It is understood that numerous other modifications and variations can be devised without departing from the scope of the invention.

What is claimed is:

1. A game system comprising at least one image output device connected to a first display device via wiring and a game apparatus configured to wirelessly communicate with the image output device, the game apparatus being connected via wiring to a second display device different from the first display device, wherein
the game apparatus includes:
a game process section for performing a game process;
an image generation section for generating images;
a first image output section for outputting images for display on the second display device; and
a first communication section for transmitting images to the image output device, the image output device includes:
a second communication section for receiving the images from the game apparatus, and
a second image output section for outputting the received images for display on the first display device,
the received images output for display on the first display device comprise a menu,
when the menu is displayed on the first display device, an image different than the menu is displayed on the second display device, and
in response to an instruction for starting a game process, in accordance with a selection from the menu, the first image output section outputs for display on the second display device a game image generated by the image generation section based on the started game process.

2. The game system according to claim 1, further comprising two operating devices each for generating operation information in response to inputs supplied thereto and for wirelessly outputting the operation information, wherein
the image output device further includes a first operation information reception section for receiving the operation information outputted by one of the two operating devices,
the second communication section transmits to the game apparatus the operation information received by the first operation information reception section or information generated from the operation information,
the first communication section receives the information transmitted by the second communication section,
the game apparatus further includes a second operation information reception section for receiving the operation information outputted by the other of the two operating devices, and
the game process section performs the game process based on the information received by the first communication section and the operation information received by the second operation information reception section.

3. The game system according to claim 2, wherein each of the operating devices includes at least one detector selected from among an acceleration sensor, an image pickup device and a gyroscope, and outputs a detection result of the detector as the operation information.

4. The game system according to claim 1, further comprising two operating devices each for generating operation information based on inputs supplied thereto and for wirelessly outputting the operation information, wherein
the game apparatus further includes an operation information reception section for receiving the operation information outputted by the two operating devices, and
the game process section performs the game process based on the operation information received by the operation information reception section.

5. The game system according to claim 4, wherein each of the operating devices includes at least one detector selected from among an acceleration sensor, an image pickup device and a gyroscope, and outputs a detection result of the detector as the operation information.

6. The game system according to claim 1, wherein
the image generation section generates first and second game images different from each other,
the first image output section outputs the first game image for display by the second display device,
the first communication section transmits the second game image to the image output device, and
the second image output section outputs the second game image for display by the first display device.

7. The game system according to claim 1, wherein
the game apparatus further includes an image compression section for compressing images generated by the image generation section,
the first communication section transmits the compressed images,
the image output device further includes an image expansion section for expanding the images received by the second communication section, and
the second image output section outputs the expanded images for display by the first display device.

8. The game system according to claim 1, wherein
the image output device is further connected to an audio output device,
the game apparatus further includes an audio generation section for generating audio based on the game process,
the first communication section further transmits the audio to the image output device,
the second communication section further receives the audio from the game apparatus, and
the image output device further includes an audio output section for outputting the audio to the audio output device.

9. The game system according to claim 1, wherein
the image output device further includes a marker,
the game system further includes an operating device equipped with an image pickup section for detecting the marker, the operating device outputting an imaging result of the image pickup section, and
the game process section performs the game process based on the imaging result of the image pickup section.

10. The game system according to claim 1, wherein
the game apparatus further includes a readout section for reading information from an external storage medium having a game program stored therein, and
the game process section performs the game process based on the game program read by the readout section.

11. The game system according to claim 10, wherein the readout section comprises a disk drive device for reading information from a disk storage medium loadable into the game apparatus.

12. The game system according to claim 1, wherein the image output device is configured to be handheld, and the first display device is provided therein.

13. The game system according to claim 1, wherein the menu is displayed selectively on the first display device or on the second display device in accordance with an instruction from a user.

14. An image display method for execution by a game system including at least one image output device connected to a first display device via wiring and a game apparatus capable of wirelessly communicating with the image output device, the game apparatus being connected via wiring to a second display device different from the first display device, wherein
the game apparatus is configured to:
perform a game process;
generate images;
output images for display on the second display device; and
transmit images to the image output device, and
the image output device is configured to:
receive the images from the game apparatus, and
output the received images for display on the first display device,
the received images output for display on the first display device comprise a menu,
when the menu is displayed on the first display device, an image different than the menu is displayed on the second display device, and
in response to an instruction for starting a game process, in response to a selection from the menu, outputting for display on the second display device, a game image based on the started game process.

15. A system comprising:
a controller;
a game apparatus including:
a processing system configured to generate images;
an output configured to output, to a first display, images generated by the processing system; and
a communication circuit configured to wirelessly transmit images generated by the processing system, and
an image output device configured to be hand-held and including:
a communication circuit configured to receive the images from the apparatus; and
a second display configured to display the received images, wherein
at least one of the received images comprises a menu identifying one or more game applications,
when the menu is displayed on the first display device, an image different than the menu is displayed on the second display device, and
in response to selection of a game application from the menu, the processing system of the apparatus is configured to generate an image for the selected game application based, at least in part, on an input from the controller.

16. The system according to claim 15, wherein the processing system generates first game images and second game images different from the first game images, the first game images being output to the first display and the second images being transmitted to the image output device for display on the second display.

17. The system according to claim 15, wherein the processing system generates game images, the game images being output to the first display and the same game images being transmitted to the image output device for display on the second display.

18. The system according to claim 15, wherein the processing system selectively generates the same game images or different game images for display on the first and second displays.

19. The system according to claim 15, wherein, based on a number of game players, the processing system generates the same game images or different game images for display on the first and second displays.

20. The system according to claim 15, wherein the first and second displays each further include speakers.

21. The system according to claim 20, wherein the processing system selectively generates the same game images and same audio or different game images and different audio for output via the first and second displays.

22. The system according to claim 15, wherein the number of different images generated by the processing system is based on whether the game apparatus can communicate with the image output device.

23. A system comprising:
an apparatus including:
a processing system configured to generate images;
an output configured to output, to a first display, images generated by the processing system; and
a communication circuit configured to wirelessly transmit images generated by the processing system, and
an image output device configured to be hand-held and including:
a communication circuit configured to receive the images from the apparatus, and
a second display configured to display the received images, wherein
at least one of the received images comprises a menu identifying one or more applications,
when the menu is displayed on the first display device, an image different than the menu is displayed on the second display device, and
in response to selection of an application from the menu, the processing system of the apparatus is configured to generate an image for the selected application.

* * * * *